United States Patent
Qahtan et al.

(10) Patent No.: US 10,525,419 B2
(45) Date of Patent: Jan. 7, 2020

(54) MEMBRANE FOR OIL-WATER SEPARATION AND SIMULTANEOUS REMOVAL OF ORGANIC POLLUTANTS

(71) Applicants: King Fahd University of Petroleum and Minerals, Dhahran (SA); Massachusetts Institute of Technology, Cambridge, MA (US)

(72) Inventors: Talal F. Qahtan, Dhahran (SA); Leonardo D. Banchik, Cambridge, MA (US); Mohammed A. Gondal, Dhahran (SA); Gibum Kwon, Cambridge, MA (US); Divya Panchanathan, Cambridge, MA (US); Umair Baig, Dhahran (SA); Gareth McKinley, Cambridge, MA (US); Mohamed A. Dastageer, Dhahran (SA)

(73) Assignees: King Fahd University of Petroleum and Minerals, Dhahran (SA); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 281 days.

(21) Appl. No.: 15/794,034

(22) Filed: Oct. 26, 2017

(65) Prior Publication Data

US 2019/0126210 A1  May 2, 2019

(51) Int. Cl.
*B01D 69/12* (2006.01)
*C02F 1/32* (2006.01)
(Continued)

(52) U.S. Cl.
CPC ............ *B01D 69/12* (2013.01); *B01D 17/00* (2013.01); *B01D 17/085* (2013.01);
(Continued)

(58) Field of Classification Search
CPC ........ B01D 69/12; B01D 69/02; B01D 69/10; B01D 69/145; B01D 69/148;
(Continued)

(56) References Cited

U.S. PATENT DOCUMENTS

| 5,221,484 A * | 6/1993 | Goldsmith | ......... B01D 39/2075 |
| | | | 210/321.75 |
| 6,592,998 B2 * | 7/2003 | Anderson | ................ B05D 7/57 |
| | | | 428/447 |

(Continued)

FOREIGN PATENT DOCUMENTS

| CN | 104759118 A | | 7/2015 |
| WO | WO 2014016524 | * | 1/2014 |

OTHER PUBLICATIONS

Molinari et al. Overview of photocatalytic membrane reactors in organic synthesis, energy storage and environmental applications. Catalysts (2019) 9, 239, p. 1-39. (Year: 2019).*

(Continued)

*Primary Examiner* — Katherine Zalasky McDonald
(74) *Attorney, Agent, or Firm* — Oblon, McClelland, Maier & Neustadt, L.L.P.

(57) ABSTRACT

An oil-water separation membrane is described. The oil-water separation membrane comprises a porous metal sheet with a photocatalyst layer on one side and a layer of nanoparticles and a surfactant on the other side. The layer of nanoparticles and surfactant create a superoleophobic and superhydrophilic coating that allows passage of an aqueous phase and rejection of an oil phase. The photocatalyst layer, combined with UV irradiation, enables degradation of organic contaminants in the aqueous phase. The oil-water separation membrane may be used as part of an oil-water separation system, and a filtered water product may be recycled through the membrane to increase the removal of organic contaminants.

20 Claims, 19 Drawing Sheets

(51) Int. Cl.

| | |
|---|---|
| *C02F 1/44* | (2006.01) |
| *B01D 69/14* | (2006.01) |
| *B01D 69/02* | (2006.01) |
| *B01D 67/00* | (2006.01) |
| *B01D 69/10* | (2006.01) |
| *C02F 101/32* | (2006.01) |
| *B01D 71/02* | (2006.01) |
| *C02F 1/72* | (2006.01) |
| *C02F 1/28* | (2006.01) |
| *B01D 17/00* | (2006.01) |

(52) U.S. Cl.
CPC ......... *B01D 67/0079* (2013.01); *B01D 69/02* (2013.01); *B01D 69/10* (2013.01); *B01D 69/145* (2013.01); *B01D 69/148* (2013.01); *C02F 1/281* (2013.01); *C02F 1/283* (2013.01); *C02F 1/325* (2013.01); *C02F 1/44* (2013.01); *C02F 1/725* (2013.01); *B01D 71/021* (2013.01); *B01D 71/022* (2013.01); *B01D 71/024* (2013.01); *B01D 71/027* (2013.01); *B01D 71/028* (2013.01); *B01D 2325/02* (2013.01); *B01D 2325/04* (2013.01); *B01D 2325/36* (2013.01); *B01D 2325/38* (2013.01); *C02F 2101/32* (2013.01); *C02F 2305/08* (2013.01); *C02F 2305/10* (2013.01)

(58) Field of Classification Search
CPC .............. B01D 67/0079; B01D 71/022; B01D 71/021; B01D 71/024; B01D 71/027; B01D 71/028; B01D 2325/10; B01D 2325/04; B01D 2325/36; B01D 2325/38; B01D 2325/02
See application file for complete search history.

(56) References Cited

U.S. PATENT DOCUMENTS

| | | | | |
|---|---|---|---|---|
| 2004/0137209 A1* | 7/2004 | Zeller | ................ | B01D 39/2034 428/304.4 |
| 2010/0233812 A1* | 9/2010 | Sun | ................ | B01D 67/0039 435/401 |
| 2010/0272941 A1 | 10/2010 | Cherukupalli et al. | | |
| 2012/0031833 A1* | 2/2012 | Ho | ................ | B01D 67/0051 210/488 |
| 2013/0059120 A1* | 3/2013 | Shi | ................ | B32B 27/304 428/147 |
| 2017/0056834 A1* | 3/2017 | Bhushan | ................ | B01D 69/02 |
| 2017/0121538 A1* | 5/2017 | Mesa, Jr. | ................ | C03C 17/002 |

OTHER PUBLICATIONS

Ayral, Andre. Ceramic membranes photocatalytically functionalized on the permeate side and their application to water treatment. Membranes (2019) 9, 64, p. 1-11. (Year: 2019).*
Bosc et al. Mesoporous anatase coatings for coupling membrane separation and photocatalyzed reactions. J. Membrane Science 265 (2005) 13-19. (Year: 2005).*
Guo et al. Virus removal and inactivation in a hybrid microfiltration-UV process with a photocatalytic membrane. Separation and Purification Technology 149 (2015) 245-254. (Year: 2015).*
Iglesias et al. Membrane-based photocatalytic systems for process intensification. Chemical Engineering Journal 305 (2016) 136-148. (Year: 2016).*
Romanos et al. Double-side active $TiO_2$-modified nanofiltration membranes in continuous flow photocatalytic reactors for effective water purification. J. Hazardous Materials 211-212 (2012) 304-316. (Year: 2012).*
Starr et al. Coating porous membranes with a photocatalyst: Comparison of LbL self-assembly and plasma-enhanced CVD techniques. J. Membrane Science 514 (2016) 340-349. (Year: 2016).*
Tung et al. Photocatalytic membrane reactors for water and wastewater treatment applications: process factors and operating conditions review. Lowland Technology International (2018) 20 (3), 413-424. (Year: 2018).*
Xiong et al. Rational design of superhydrophilic/superoleophobic surfaces for oil-water separation via thiol-acrylate photopolymerization. ACS Omega, 2018, 3(8) 10278-10285. (Year: 2018).*
Leonardo David Banchik et al., "Advances in Membrane-Based Oil-Water Separation," Massachusetts Institute of Technology, Feb. 2017, 124 Pages.

* cited by examiner

MEMBRANE FOR OIL-WATER SEPARATION AND SIMULTANEOUS REMOVAL OF ORGANIC POLLUTANTS

TECHNICAL FIELD

The present invention relates to a nanostructured membrane for purifying water from both oil and an organic aqueous pollutant.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Oil and gas extraction activities result in the production of a significant amount of water. In fact, the extraction of one barrel (bbl) of oil will usually yield multiple bbls of "produced water," which leads to the industry adage that oil producers are in fact primarily water producers, who happen to also produce oil. The American Petroleum Institute (API) estimates that annual onshore oil production in the United States results in 18 billion bbls of produced water, or 7.5 bbls of water per a bbl of oil. See API, "Overview of exploration and production waste volumes and waste management practices in the United States," American Petroleum Institute, Washington D.C., May 2000—incorporated herein by reference in its entirety. Globally, the annual volume of produced water from oil extraction is estimated at 210 million bbls per day, or almost 77 billion bbls per year. See Khatib, Z., & P. Verbeek, "Water to value—produced water management for sustainable field development of mature and green fields," *Journal of Petroleum Technology*, pp. 26-28. January 2003—incorporated herein by reference in its entirety. This corresponds to about 3 bbls of produced water per each bbl of oil. As oil fields age, the ratio of produced water to oil increases, and this is why U.S. fields, which are older than the global average, produce more contaminated water.

In the coming years, the reuse of produced water for beneficial purposes up to and including potable water supply is likely to rise, particularly in oil-producing regions which have few alternative sources of water. A major challenge faced in expanding the use of produced water for beneficial purposes is the effective and economic removal of pollutants from the water. A range of organic and inorganic components are generally present in produced water and must be removed before the water can be used for any beneficial purpose See Tibbetts, et al., "A Comprehensive Determination of Produced Water Composition," *Produced Water*, J. P. Ray and F. R. Englehart (eds), Plenum Press, New York 1992—incorporated herein by reference in its entirety. In light of these circumstances, an effective and economic method for oil-water separation and simultaneous removal of organic pollutants from the produced water is of utmost importance. There are no available reports in the literature on in-air superhydrophilic and superoleophobic membranes for oil-water separation and simultaneous removal of organic pollutants.

In view of the forgoing, one objective of the present invention is to provide an advanced multifunctional robust membrane having in-air superhydrophilicity and superoleophobicity, an oil-water separation system that houses the membrane, and a method of using the system for efficient oil-water separation and simultaneous removal of organic pollutants.

BRIEF SUMMARY OF THE INVENTION

According to a first aspect, the present disclosure relates to an oil-water separation membrane that includes (i) a porous metal sheet with a first side and a second side, (ii) a feed side coating deposited on the first side of the porous metal sheet, the feed side coating including (iia) a first layer in direct contact with the first side of the porous metal sheet, wherein the first layer comprises nanoparticles and an adhesive, and (iib) a surfactant deposited on the first layer, and (iii) a permeate side coating deposited on the second side of the porous metal sheet, the permeate side coating comprising a layer of photocatalyst nanoparticles.

In one embodiment, the porous metal sheet has a thickness of 40-100 µm and a pore size of 0.5-4 µm.

In one embodiment, the porous metal sheet comprises steel.

In one embodiment, the nanoparticles are silica nanoparticles with a diameter of 5-100 nm.

In one embodiment, the adhesive includes a cyanoacrylate in reacted form.

In one embodiment, the surfactant is an amphoteric fluorosurfactant.

In one embodiment, the photocatalyst nanoparticles have diameters of 25-100 nm.

In one embodiment, the photocatalyst nanoparticles comprise at least one metal oxide selected from the group consisting of $TiO_2$, $WO_3$, ZnO, NiO, CuO, $SnO_2$, $CeO_2$, $SiO_2$, $ZrO_2$, $Al_2O_3$, and $Fe_2O_3$.

In one embodiment, the oil-water separation membrane is both hydrophilic with a water contact angle in air of 0°-5°, and oleophobic with an oil contact angle in air of 145°-165°.

In one embodiment, the feed side coating has a thickness of 10-50 µm, and the permeate side coating has a thickness of 200 nm-5 µm.

In one embodiment, the feed side coating, the permeate side coating, or both comprise activated carbon or a zeolite.

According to a second aspect, the present disclosure relates to an oil-water separation system that includes (i) a vessel with an internal cavity, (ii) the oil-water separation membrane of the first aspect, which divides the internal cavity into a feed zone and a permeate zone, and (iii) a UV light source configured to irradiate a UV light to the permeate side coating of the oil-water separation membrane, wherein the feed zone has a feed inlet to deliver an oil-water mixture to the feed zone, and wherein the permeate zone has a water outlet to reject water from the permeate zone.

In one embodiment, the separation membrane is tilted at an angle of 15°-30° above a horizontal plane.

According to a third aspect, the present disclosure relates to a method of producing a purified water product from a contaminated water mixture comprising an oil phase and an aqueous phase having an organic aqueous pollutant with the oil-water separation system of the second aspect. This the method involves (i) contacting the contaminated water mixture with the feed side coating of the oil-water separation membrane, wherein the aqueous phase permeates through the oil-water separation membrane and into the permeate side coating, leaving a retained oil phase in the feed zone, and (ii) irradiating the permeate side coating with UV light to photo-catalytically degrade a portion of the organic aqueous pollutant present in the aqueous phase that permeates through the oil-water separation membrane to produce a purified water product.

In one embodiment, the UV light has an intensity of 450-1550 mW/cm$^2$.

In one embodiment, a pressure difference across the membrane is 0-5 kPa.

In a further embodiment, the pressure difference is 0-1 kPa, and the aqueous phase permeates through the membrane at a flow speed of 0.5-5.0 mm/s.

In one embodiment, the method further includes draining the retained oil phase from the feed zone and reapplying the purified water product to the feed side coating.

In a further embodiment, where the method further comprises draining the retained oil phase and reapplying the purified water product, the reapplying is done at least 9 times to produce a purified water product having at least a 99% reduction in a concentration of the organic contaminant compared to a concentration of the organic contaminant in the aqueous phase before the contacting.

In a further embodiment, where the method further comprises draining the retained oil phase and reapplying the purified water product, the reapplying is done at least 9 times and at least 99 wt % of the oil phase, relative to a total weight of the oil phase in the contaminated water mixture, is retained as the retained oil phase.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
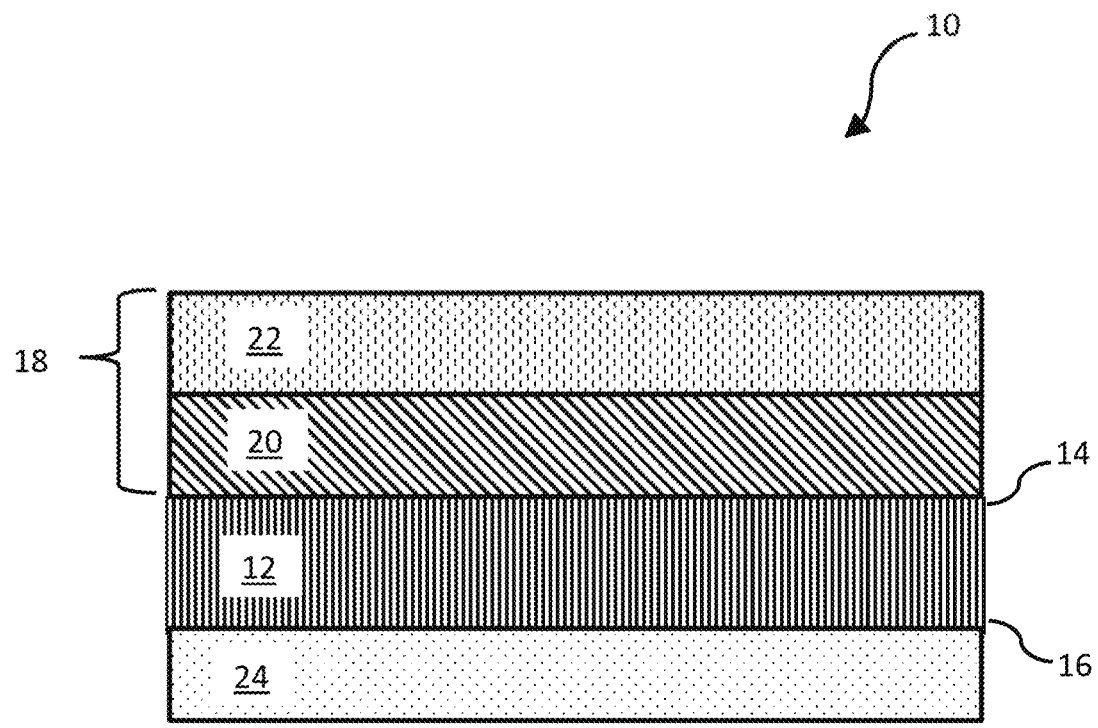
FIG. 1 is a schematic of the oil-water separation membrane.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

For polygonal shapes, the term "diameter", as used herein, and unless otherwise specified, refers to the greatest possible distance measured from a vertex of a polygon through the center of the face to the vertex on the opposite side. For a circle, an oval, and an ellipse, "diameter" refers to the greatest possible distance measured from one point on the shape through the center of the shape to a point directly across from it.

As used herein, "compound" is intended to refer to a chemical entity, whether as a solid, liquid, or gas, and whether in a crude mixture or isolated and purified.

According to a first aspect, the present disclosure relates to an oil-water separation membrane 10, which is also referred herein as "membrane," unless otherwise noted. The membrane comprises a porous metal sheet 12. In one embodiment, the porous metal sheet may be the main structural support for the membrane. Preferably, the porous metal sheet has two substantially planar faces being a first side 14 and a second side 16, where the term "substantially planar" refers to height variations within any given section (e.g., sections about 3 mm in diameter) of either face being reduced to about 1 mm or less, or 0.1 mm or less, and may be in the shape of a rectangle, oval, ellipse, circle, or other shape and have a diameter or longest dimension of 0.5-10 cm, preferably 1-5 cm, more preferably 1.2-3 cm. Preferably the shape and longest dimension of the porous metal sheet supports a membrane having the same shape and longest dimension. In alternative embodiments, the diameter or longest dimension of the porous metal sheet may be larger, for instance, 10-100 cm, or 20-50 cm. In one embodiment, the porous metal sheet has a thickness, or maximum thickness, of 40-100 µm, preferably 50-95 µm, more preferably 60-90 µm, and a pore size of 0.5-4.0 µm, preferably 1.0-3.0 µm, more preferably 1.5-2.5 µm. The porous metal sheet may have a void volume percentage of 10-40%, preferably 12-30%, more preferably 15-25% relative to a bulk volume of the porous metal sheet.

The porous metal sheet 12 may have first 14 and second 16 sides that are substantially similar or indistinguishable, for instance having essentially the same surface texture and pore size. In other embodiments, the porous metal sheet may have first and second sides that are different, for instance, the pores may have a generally frustoconical shape, with the smaller diameter opening on one side and the larger diameter opening on the other side. Alternatively, one side may have a different surface texture or metal composition than the other side.

The porous metal sheet 12 may comprise a metal or metal alloy including, but not limited to aluminum, copper, brass, bronze, mild steel, stainless steel, zinc (for instance, in galvanized steel), iron, nickel, titanium, INCONEL, MONEL, NIMONIC, STELLITE, or phosphor bronze. In one embodiment, the porous metal sheet comprises stainless steel, preferably the stainless steel is type 304, 316, or 316L, or an austenitic chromium-nickel stainless steel doped 2-3 wt % with molybdenum.

In one embodiment, the porous metal sheet 12 may be formed from a solid, non-porous metal sheet by mechanically perforating the metal sheet, or by chemical etching pores. In another embodiment, the porous metal sheet a be formed by compressing together or welding metal wires or microparticles (for instance, as an agglomerate of particles), by pouring a liquid metal into a mold, or mixing a liquid metal with a pore-forming agent that may be later dissolved or removed to create empty pores within the metal. Preferably a majority of the pores in the porous metal sheet are interconnected between both sides of the porous metal sheet, in order to allow a liquid to flow through from one side to the other.

In a preferred embodiment, the porous metal sheet 12 may be a wire mesh. Here, the wire mesh may be formed from wires having diameters of 5-50 µm, preferably 10-45 µm, more preferably 20-40 µm. The wires may be weaved together by a twill dutch weave, a hex weave, a plain weave, a twill weave, a basketweave, or by some other repeating pattern, design, or arrangement.

In an alternative embodiment, a non-metal support may be used in place of the porous metal sheet 12, for instance, a porous glass frit, a ceramic membrane, a mesh of cellulose fibers, or a porous sheet of polyvinyl chloride or polyvinylidene difluoride. In another alternative embodiment, an existing filter or water filtration membrane may be used in place of the porous metal sheet.

As shown in FIG. 1, the porous metal sheet 12 has a first layer 20 of both nanoparticles and an adhesive deposited on the first side 14, and a surfactant 22 deposited on the first layer 20. Together, the first layer and the surfactant make up the feed side coating 18.

The first layer 20 may be deposited on the first side 14 of the porous metal sheet by contacting the porous metal sheet 12 with a mixture of nanoparticles and an adhesive. This contacting may be done by spraying, however, other methods may be used such as brushing, rolling, spreading, or dipping the first side of the porous metal with a surface of the mixture. In one embodiment, nanoparticles without an adhesive may be deposited on the porous metal sheet by spraying, chemical vapor deposition, slip coating, dip coating, dip-evaporation, film casting, or electrospinning, and then an adhesive may be sprayed onto them to fix them into place. In a related embodiment, an adhesive may be sprayed onto the porous metal sheet before the nanoparticles are deposited.

In one embodiment, the nanoparticles may comprise silica, quartz, polystyrene, crosslinked poly(styrene/divinylbenzene), poly(methyl methacrylate), cobalt, aluminum oxide, magnetite, aluminum oxide, iron(III) oxide, zinc oxide, carbon black, titanium oxide, or may comprise some other metal or non-metal. In one preferred embodiment, the nanoparticles are silica nanoparticles. In one embodiment, the nanoparticles have diameters of 5-100 nm, preferably 6-50 nm, more preferably 6-20 nm. Preferably the nanoparticles have a substantially uniform diameter, meaning that any diameter measured through the center of any nanoparticle deviates from the average diameter by an amount less than 5 nm, preferably less than 4 nm, more preferably less than 3.5 nm. In an alternative embodiment, the nanoparticles may have an ellipsoidal, an oblong, an ovoid, or some other rounded shape. In another embodiment, the nanoparticles may be mesoporous or microporous. The term "microporous" means a surface having an average pore diameter of less than 2 nm, while the term "mesoporous" means a surface having an average pore diameter of 2-50 nm. In an alternative embodiment, the nanoparticles are silica nanoparticles that are surface functionalized by silanization, for example, with (3-mercaptopropyl) triethoxysilane (MPTES) or 3-aminopropyltriethoxysilane (APTES).

In an alternative embodiment, microparticles having diameters of 0.1-10 µm may be used in place of nanoparticles, and in a further embodiment, the microparticles may be porous, such as silica gel. A porous silica gel may provide additional water filtration abilities, and may have a high specific surface area, for instance, 600-900 $m^2/g$.

In one embodiment, the adhesive may be a thermoplastic (hot-melt) rubber resin adhesive, a solvent-based resin adhesive, a polyphenol resin, an epoxy, a silicone based adhesive, a polyvinyl acetate based adhesive, a polyurethane based adhesive, a thermoplastic or thermosetting plastic, or an acrylic polymer based adhesive. Preferably, the adhesive may comprise an acrylic polymer based adhesive or resin, such as polymers formed from methacrylate, cyanoacrylate, methyl methacrylate, ethyl acrylate, 2-chloroethyl vinyl ether, 2-ethylhexyl acrylate, hydroxyethyl methacrylate, butyl acrylate, butyl methacrylate, or trimethylolpropane triacrylate (TMPTA) monomers, or mixtures thereof. In one preferred embodiment, the adhesive comprises a cyanoacrylate monomer, in reacted form. The cyanoacrylate may be methyl cyanoacrylate, ethyl cyanoacrylate, butyl cyanoacrylate, octyl cyanoacrylate, and/or 2-octyl cyanoacrylate. Where the adhesive comprises a cyanoacrylate, the adhesive may be a commercial preparation, such as SUPER GLUE, KRAZY GLUE, SUPAFIX, LOCTITE, LAZERBOND, PERMABOND, DERMABOND, or 3M SCOTCH-WELD. In one embodiment, the adhesive is a 3M SCOTCH-WELD adhesive, more specifically, 3M SCOTCH-WELD Super Fast instant Adhesive SF100. The adhesive may be doped with other compounds such as phthalic anhydride, poly (methyl methacrylate), hydroquinone, or sulfonic acid in order to adjust physical and chemical properties such as viscosity, curing speed, or adhesion strength. These other compounds may be doped at a weight percent of 0.01-10 wt %, preferably 0.1-5.0 wt %, more preferably 0.2-3.0 wt % relative to a total weight percentage of the adhesive.

The mixture for the first layer coating may comprise the nanoparticles and the adhesive dispersed in a solvent. The solvent may be acetone, ethanol, methanol, 2-propanol, or some other organic solvent. The nanoparticles may be present in the mixture at a mass concentration of 5-25 mg/mL, preferably 10-20 mg/mL, more preferably 12-17 mg/mL. The adhesive may be present in the mixture at a mass concentration of 1-15 mg/mL, preferably 2-10 mg/mL, more preferably 3-8 mg/mL. In one embodiment, the mixture may be applied to the first side 14 at a volume per area ratio of 0.5-1.8 $mL/cm^2$, preferably 0.7-1.5 $mL/cm^2$, more preferably 0.8-1.2 $mL/cm^2$. However, in other embodiments, the mixture may be, applied at higher or lower volume per area ratios depending on concentrations in the mixture being lower or higher. In one embodiment, the mixture may be applied in separate portions, for instance, a 1.0 $mL/cm^2$ volume may be broken down into 4 separate applications of about 0.25 $mL/cm^2$ each, while allowing the mixture to dry between each application. In an alternative embodiment, a mixture of nanoparticles and adhesive, or nanoparticles and adhesive separately, may be applied to the first side without a solvent.

Preferably the mixture for the first layer is deposited on one side of the porous metal sheet 12 (i.e. on the first side 14) without blocking the pores. In another embodiment, the average pore diameter may be decreased by 5-50%, preferably 10-40%, more preferably 12-30% compared to the average pore diameter of a wire mesh without any layers. This decrease in the average pore diameter may result from the first layer 20 conforming to the morphology of the porous metal sheet.

The first layer thickness may vary, for instance, the first layer 20 may have a maximal thickness at a point on the porous metal sheet 12 located farthest from the second side 16, but a thickness 30-60% smaller at a location on the first side 14 within or proximal to a pore. In one embodiment, the mixture for the first layer may cover the pores when applied but then shrink and expose a population of pores upon the curing and drying of the adhesive. In one embodiment, the first layer 20 may have a maximum thickness of 1 µm-50 µm, preferably 4 µm-40 µm, more preferably 5 µm-30 µm.

A surfactant 22 is deposited on the first layer 20, and surfactant may be an anionic surfactant, a cationic surfactant, an amphoteric surfactant, a zwitterionic, a non-ionic surfactant, a fluorosurfactant, and/or a sulfonic acid derivative.

A surfactant, as defined here, is a compound that lowers the surface tension (or interfacial tension) between two liquids or between a liquid and solid. A surfactant 22 may act as a detergent, a wetting agent, an emulsifier, a foaming agent, and/or a dispersant. An amphoteric surfactant, as defined here, is a surfactant molecule or ion that can react both as an acid as well as a base. An amphoteric surfactant may furthermore be a zwitterionic surfactant, which is a surfactant having localized positive and negative charges, but an overall neutral charge. Examples of zwitterionic (and amphoteric) surfactants include, but are not limited to, CHAPS (3-[(3-cholamidopropyl)dimethylammonio]-1-propanesulfonate), cocamidopropyl hydroxysultaine, cocamidopropyl betaine, and phospholipids such as phosphatidylserine, phosphatidylethanolamine, phosphatidylcholine, and sphingomyelin.

A fluorosurfactant, as defined here, is a surfactant having a polyfluorinated or perfluorinated tail. The perfluorinated tail is an organofluorine compound having no C—H bonds but containing C—F bonds, C—C bonds, and other heteroatoms. In one embodiment, the surfactant may be a fluorosurfactant having a polyfluorinated tail with a mix of C—F and C—H bonds. The fluorosurfactant may be perfluorooctanoic acid (PFOA), perfluorooctane sulfonate (PFOS), perfluorohexane sulfonic acid (PFHxS), perfluorononanoic acid (PFNA), and/or perfluorodecanoic acid (PFDA). In one embodiment, the fluorosurfactant may be a CAPSTONE fluorosurfactant, including, but not limited to FS-30, FS-31, FS-34, FS-35, FS-50, FS-51, FS-60, FS-61, FS-63, FS-64 FS-65, FS-66, and/or FS-81. In one embodiment, the surfactant 22 is an amphoteric fluorosurfactant, such CAPSTONE FS-50.

Before applying the surfactant 22, the surfactant may be diluted in an alcohol such as methanol, ethanol, or isopropanol to a concentration of 20-60 mg/mL, preferably 30-55 mg/mL, more preferably 40-50 mg/mL. In one embodiment, the surfactant 22 may be applied after the first layer 20 dries completely, however, in another embodiment, the surfactant may be applied before the first layer dries completely. The surfactant may be applied by spraying or by any of the previously discussed application methods. A surfactant diluted as discussed above may be applied to the first layer at a volume per area ratio of 0.1-1.0 mL/cm$^2$, preferably 0.2-0.8 mL/cm$^2$, more preferably 0.3-0.7 mL/cm$^2$, or may have higher or lower volume per area ratios based on surfactant concentrations that are lower or higher. In an alternative embodiment, a surfactant may be applied directly to the first layer without diluting the surfactant. The surfactant may have a varying thickness as previously described for the first layer, a different thickness near pores, and a maximum thickness of 100 nm-20 μm, preferably 200 nm-5 μm, more preferably 400 nm-1 μm.

In one embodiment, nanoparticles, adhesive, surfactant, and/or solvents may pass through and away from the porous metal sheet 12 during application or filtering, for example, an excess of a coating may pass through the pores of the porous metal sheet. In another embodiment, a first layer 20 and/or a surfactant 22 may not be applied homogeneously over the first side 14. Here, one or more regions of the first side may be exposed metal or exposed first layer that does not have surfactant. Preferably the feed side coating 18 has both micro and nanoscale hierarchical surface roughness, which increases the specific surface area of the feed side coating (as compared to the specific surface area of a smooth coating on a flat substrate). This increase in the specific surface area leads to an increase in the surface wettability. In an alternative embodiment, a surfactant may be adsorbed or chemically functionalized to a porous metal sheet or to some other porous sheet or membrane without the presence of nanoparticles or an adhesive.

In one embodiment, the second side 16 of the porous metal sheet 12 has a permeate side coating 24 comprising a layer of photocatalyst nanoparticles. In a related embodiment, the permeate side coating may consist of only a layer of photocatalyst nanoparticles. The photocatalyst nanoparticles may have diameters of 25-100 nm, preferably 30-80 nm, more preferably 35-70 nm, and specific surface areas (such as the surface area determined by BET) of 20-80 m$^2$/g, preferably 25-75 m$^2$/g, more preferably 30-70 m$^2$/g. The photocatalyst nanoparticles may be substantially spherical, or may be ellipsoidal, oblong, ovoid, or some other rounded shape. In an alternative embodiment, the photocatalyst nanoparticles may be cubic, prismatic, or some other shape with straight edges and/or faces. In another embodiment, the photocatalyst nanoparticles may be mesoporous or microporous. In one embodiment, the photocatalyst nanoparticles comprise at least one metal oxide selected from the group consisting of $TiO_2$, $WO_3$, $ZnO$, $NiO$, $CuO$, $SnO_2$, $CeO_2$, $SiO_2$, $ZrO_2$, $Al_2O_3$, and $Fe_2O_3$. Preferably the metal oxide may be $TiO_2$, $ZnO$, $SnO_2$, $CeO_2$, and/or $ZrO_2$. In a preferred embodiment, the metal oxide may be $TiO_2$. In one embodiment, the photocatalyst nanoparticles may comprise metals including, but not limited to, Ti, W, Sn, Ce, Al, V, Fe, Co, Ni, Cu, Zn, Ru, Rh, Pd, Ag, Pt, and Au, and/or other metal compounds containing one of those metals and one or more non-metal elements. As previously described for the first layer, 20 the layer of photocatalyst nanoparticles may partially block the pores from the second side 16 of the porous metal sheet 12 and may form a layer having a varying thickness near the pores. The layer of photocatalyst nanoparticles, or the permeate side coating 24 may have a maximum thickness of 200 nm-5 μm, preferably 500 nm-4 μm, more preferably 800 nm-3 μm.

Before applying the photocatalyst nanoparticles, the photocatalyst nanoparticles may be diluted in a solvent such as tetrahydrofuran (also known as THF or oxalane), 2-methyltetrahydrofuran, diethyl ether, hexane, methanol, ethanol, acetone, or isopropanol to a concentration of 1-15 mg/mL, preferably 2-12 mg/mL, more preferably 3-10 mg/mL.

In one embodiment, the photocatalyst nanoparticles may be applied after the feed side coating 18 dries completely; however, in another embodiment, the photocatalyst nanoparticles may be applied before the feed side coating 18 dries completely, or before anything is deposited on the first side 14. The photocatalyst nanoparticles may be applied by spraying, chemical vapor deposition, slip coating, dip coating, dip-evaporation, film casting, electrospinning, or by any of the previously discussed application methods. A mixture of photocatalyst nanoparticles diluted as discussed above may be applied to the second side 16 at a volume per area ratio of 0.5-2.5 mL/cm$^2$, preferably 0.8-2.0 mL/cm$^2$, more preferably 1.0-1.8 mL/cm$^2$, or may have higher or lower volume per area ratios based on photocatalyst nanoparticle concentrations that are lower or higher. In an alternative embodiment, photocatalyst nanoparticles may be applied directly to the second side without mixing the photocatalyst nanoparticles in a solvent. In another alternative embodiment, photocatalyst nanoparticles may be applied to the first layer 20 or to the surfactant 22. In a related alternative embodiment, a porous metal sheet 12 may have photocatalyst nanoparticles deposited on both sides (for instance, by dip coating), and then the first layer and the surfactant applied to one side (for instance, by spray coating). In another alternative embodiment, the porous metal sheet may comprise a photocatalyst material, meaning that an additional layer of photocatalyst nanoparticles would not be required.

In one embodiment, the photocatalyst nanoparticles may be present as agglomerates. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be the photocatalyst nanoparticles having an average diameter as mentioned previously. These agglomerates may have a largest dimension of 50 nm-1 μm, preferably 75 nm-800 nm, more preferably 100-500 nm.

In one embodiment, a feed side coating 18 or a permeate side coating 24 having a maximum pore size of 0.2 μm or less may enable the membrane 10 to be used as a "sterile filter" to remove microbes from a solution by filtering. The solution may be a cell growth medium or a buffered solution for use in cell culture.

In one embodiment, the feed side coating 18, the permeate side coating 24, or both comprise activated carbon or a zeolite. The activated carbon or zeolite may be present as an additional layer or mixed as particles with the nanoparticles, adhesive, surfactant, or photocatalyst nanoparticles. The activated carbon may comprise granular activated carbon having a pore volume of 0.5-1.0 cm$^3$/g, preferably 0.6-1.0 cm$^3$/g, more preferably 0.7-1.0 cm$^3$/g, even more preferably 0.8-1.0 cm$^3$/g; a specific surface area of 700 to 1500 m$^2$/g, preferably 1000 to 1500 m$^2$/g, more preferably 1200 to 1500 m$^2$/g; and an average pore diameter of 12-30 Å, preferably 12-20 Å, more preferably 12-15 Å. Alternatively, the activated carbon may comprise powdered activated carbon, having a pore volume of 0.1-0.5 cm$^3$/g, preferably 0.3-0.5 cm$^3$/g, more preferably 0.4-0.5 cm$^3$/g; a specific surface area of 700 to 1500 m$^2$/g, preferably 1000 to 1500 m$^2$/g, more preferably 1200 to 1500 m$^2$/g; and an average pore diameter of 12-30 Å, preferably 15-30 Å, more preferably 20-30 Å. The activated carbon may have other characteristics beneficial for water purification, such as an iodine number of 900 to 2000 mg/g, preferably 1500 to 2000 mg/g; a pore volume of 0.3 to 0.8 cm$^3$/g, preferably 0.4 to 0.6 cm$^3$/g; a specific surface area (BET) of 1000 to 2000 m$^2$/g, preferably 1500 to 2000 m$^2$/g; a micro-pore size of 12 to 20 Å, preferably 14 to 20 Å, and a meso-pore size of 30 to 40 Å, preferably 30 to 37 Å. The term "iodine number" of an activated carbon is a representative index of the specific surface area of the activated carbon. A layer of activated carbon may also comprise a layer of charcoal particles for absorbing organic compounds, for example common volatile and semivolatile organic compounds, tannins, fluoride, arsenic, metals, phenolic compounds, mercury-containing compounds, organic solvents, chlorine, and/or microbes.

The zeolite may comprise a naturally occurring aluminosilicate particle. Elementary building units of zeolite particles are SiO$_4$ and AlO$_4$ tetrahedra. Adjacent tetrahedra are linked at their corners via a common oxygen atom, which results in an inorganic macromolecule with a three-dimensional framework. The three-dimensional framework of a zeolite also comprises channels, channel intersections, and/or cages having dimensions in the range of 0.1-10 nm, preferably 0.2-5 nm, more preferably 0.2-2 nm. Water molecules may be present inside these channels, channel intersections, and/or cages.

In one embodiment, a silicon-to-aluminum molar ratio of zeolite particles may be at least 10, or preferably at least 20, or preferably at least 30, or preferably at least 40, or preferably at least 45, or preferably at least 50, but no more than 100. In another embodiment, the zeolite particles comprise micro-pores (i.e. pores having an average pore diameter of less than 2 nm) having a specific pore volume in the range of 0.1-0.3 cm$^3$/g, preferably 0.1-0.2 cm$^3$/g, more preferably 0.15-0.2 cm$^3$/g, and meso-pores (i.e. pores having an average pore diameters in the range of 2-50 nm) having a specific pore volume in the range of 0.01-0.15 cm$^3$/g, preferably 0.05-0.15 cm$^3$/g, more preferably 0.05-0.10 cm$^3$/g. In one embodiment, a specific pore volume of macropores (i.e. pores having an average pore diameter of above 50 nm) in the zeolite particles is less than 0.2 cm$^3$/g, preferably less than 0.1 cm$^3$/g, more preferably less than 0.01 cm$^3$/g. In one embodiment, a specific surface area of the micro-pores in the zeolite particles is in the range of 100-500 m$^2$/g, preferably 300-500 m$^2$/g, more preferably about 400 m$^2$/g, whereas a specific surface area of the meso-pores in the zeolite particles is in the range of 50-150 m$^2$/g, preferably 50-100 m$^2$/g, more preferably about 80 m$^2$/g. A specific surface area of the macro-pores in the zeolite particles may be in the range of 500-1,000 m$^2$/g, preferably 700-1,000 m$^2$/g, more preferably about 850 m$^2$/g. In another embodiment, an average pore diameter of all the micro-pores, the meso-pores, and the macro-pores in the zeolite particles is in the range of 1-10 nm, preferably 2-6 nm, more preferably about 5 nm. In an alternative embodiment, the zeolite may be in the form of pellets having a diameter in the range of 0.5-5 mm, preferably 0.5-1.5 mm, more preferably about 1 mm.

The zeolite particles comprise at least one selected from the group consisting of a 4-membered ring zeolite, a 6-membered ring zeolite, a 10-membered ring zeolite, and a 12-membered ring zeolite. The zeolite particles may have a natrolite framework (e.g. gonnardite, natrolite, mesolite, paranatrolite, scolecite, and tetranatrolite), an edingtonite framework (e.g. edingtonite and kalborsite), a thomsonite framework, an analcime framework (e.g. analcime, leucite, pollucite, and wairakite), a phillipsite framework (e.g. harmotome), a gismondine framework (e.g. amicite, gismondine, garronite, and gobbinsite), a chabazite framework (e.g. chabazite-series, herschelite, willhendersonite, and SSZ-13), a faujasite framework (e.g. faujasite-series, Linde type X, and Linde type Y), a mordenlite framework (e.g. maricopaite and mordenite), a heulandite framework (e.g. clinoptilolite and heulandite-series), a stilbite framework (e.g. barrerite stellerite, and stilbite-series), a brewsterite framework, or a cowlesite/ZSM-5 framework. In one embodiment, the zeolite may be pillared. A pillared zeolite is a type of zeolite, wherein pillar structures (e.g. silica pillars) are located between two adjacent layers in the zeolite. The zeolite particle may have a geometry selected from the group consisting of cylindrical, rectilinear, star-shaped, conical, pyramidal, rectangular, cubical, and ring-shaped. In one embodiment, some zeolite particles may be crystalline, having a high cation exchange capacity and an ability to physically capture micron-sized particles from water. In one embodiment, the zeolite layer is able to remove particles having a size in the range of 0.5-20 µm, preferably 1-15 µm, more preferably 1-10 µm. The zeolite layer may also remove fluoride as well as halogenated organic compounds.

In an alternative embodiment, more than one porous metal sheet 12 or other porous support may be used in constructing a single membrane. For instance, a first porous metal sheet may be dip-coated in a mixture comprising the nanoparticles and an adhesive, and then the surfactant may be on one or both sides. A second porous metal sheet may be dip-coated in a mixture comprising the photocatalyst nanoparticles. Then, the first porous metal sheet and the second porous metal sheet may be placed together, though in a further embodiment, an additional filtration material such as activated carbon, a zeolite, a silica gel, a resin, charcoal, sand, gravel, coarse silica, ceramic media, or a capillary membrane may be placed between them.

In one embodiment, the oil-water separation membrane 10 has a thickness of 50-200 µm, preferably 60-150 µm, more preferably 70-120 µm. In one embodiment, the membrane may be flexible to allow bending along a curve having a radius of curvature of 8 cm or greater, preferably 15 cm or greater, more preferably 20 cm or greater without separating or damaging the feed side coating 18 or the permeate side coating 24. In an alternative embodiment, a membrane may be formed on a porous metal surface that has an existing curve or may be rolled into a cylinder. Where the porous metal surface is a cylinder, such as a tube or a pipe, the feed side coating may be deposited on the interior surface, with the permeate side coating on the exterior surface.

In one embodiment, the oil-water separation membrane 10 is both hydrophilic and oleophobic. Preferably the micro and nanoscaled surface roughness adds to the hydrophilicity and/or the oleophobicily as compared to a smooth, flat surface of the same chemical composition. Here, the oil-water separation membrane is hydrophilic with a water contact angle in air of 0°-5°, preferably 0°-4°, more preferably 0°-3°. This contact angle may be observed by placing a drop of water on the surface of the membrane, for instance, by pipetting 4-6 µL of water onto the membrane, or by spraying a mist of water droplets onto the membrane. Preferably, a goniometer may be used to measure the contact angles. In another embodiment, drop sizes of 40-60 µL may be used to observe contact angles. Preferably, the surface of interest is the feed side coating 18 of a membrane positioned horizontally with the feed side coating on top. However, similar water contact angles may be obtained on a membrane tilted at different angles. A drop of water adopting such a small contact angle may cause the appearance of the drop being completely adsorbed onto or absorbed into the membrane. The membrane is also oleophobic with an oil contact angle in air of 145°-165°, preferably 150°162°, more preferably 153°160°. In some embodiments, the oil contact angle may be greater than 165°. Preferably, the surface is the feed side coating of a membrane positioned horizontally with the feed side coating on top. The contact angle may be measured by spraying or placing a drop of oil on the membrane, similar to what was mentioned previously with the drop of water. The large oil contact angle may produce the appearance of a bead or a spherical drop of oil. Here, the oil may be a non-polar substance adopting a liquid state at room temperature (20-27° C.). The oil may be a linear or branched alkane with a general formula of $C_nH_{2n+2}$, where n may have a value of 7-18, preferably 10-17, more preferably 12-16. In one preferred embodiment, n may have a value of 16, and the oil may be hexadecane. In another embodiment, the oil may have a surface tension at 19-22° C. of 10-50 mN/m, preferably 15-40 mN/m, more preferably 20-35 mN/m. In other embodiments, the oil may be some other organic molecule with a non-polar character and similar surface tension. In other embodiments, the oil may be a mixture of organic molecules, for instance, a plant-based oil or a petroleum product such as mineral oil. In an alternative embodiment, the membrane is hydrophilic but not oleophobic. In an alternative embodiment, a feed side coating deposited on a non-porous substrate, for instance, on a glass slide, may produce similar water contact angles and/or similar oil contact angles.

According to a second aspect, the present disclosure relates to an oil-water separation system 26, comprising a vessel 28 with an internal cavity. The vessel, may be cylindrical, cuboid, frustoconical, or some other shape. The vessel walls may comprise a material including, but not limited to, glass, polypropylene, polyvinyl chloride, polyethylene, and/or polytetrafluoroethylene, and the vessel walls may have a thickness of 0.1-3 cm, preferably 0.1-2 cm, more preferably 0.2-1.5 cm. The internal cavity may have a volume of 2 mL-100 mL, preferably 2.5 mL-50 mL, more preferably 3 mL-20 mL. In another embodiment, for instance, for small scale or benchtop water purification, the internal cavity may have a volume of 100 mL-50 L, preferably 1 L-20 L, more preferably 2 L-10 L. In another embodiment, for instance, for pilot plant purification, the internal cavity may have a volume of 50 L-10,000 L, preferably 70 L-1,000 L, more preferably 80 L-2,000 L. In another embodiment, for instance, for industrial plant-scale purification, the internal cavity may have a volume of 10,000 L-500,000 L, preferably 20,000 L-400,000 L, more preferably 40,000 L-100,000 L.

The vessel 28 also comprises the oil-water separation membrane 10 of the first aspect, which divides the internal cavity into a feed zone 32 and a permeate zone 38. In one embodiment, the internal cavity has an inner flange, gasket, shelf, or other structural support 30 for the membrane. Preferably, the membrane is removably attached within the internal cavity and is positioned perpendicularly to a central axis of the vessel. In one embodiment, vessels having larger volume internal cavities may have more than one membrane placed side by side and supported or secured by a perforated sheet, a grid, a mesh, a frame, or beams spanning a cross-section of the internal cavity and attached to the vessel wall.

In an alternative embodiment, a side of the vessel may have a slot for a membrane to be inserted or removed from the outside of the vessel.

In a preferred embodiment, the feed zone 32 is the volume of the internal cavity adjacent to the feed side coating 18, and the permeate zone 38 is the other part of the internal cavity, adjacent to the permeate side coating 24. The membrane 10 may be positioned so that the feed zone has a volume that is 30-99%, preferably 40-80%, more preferably 45-75% of the total volume of the internal cavity. The permeate zone may have a volume that is 1-70%, preferably 20-60%, more preferably 25-55% of the total volume of the internal cavity. The membrane itself may occupy a volume that is 0.001-1% of the total volume of the internal cavity, or may occupy a smaller volume or a volume considered negligible in relation to the size of the internal cavity. In one embodiment, the feed zone and permeate zone have similar shapes, such as cylinders with similar diameters. However, in other embodiments either the feed zone or the permeate zone may have a smaller diameter, width, or cross-section area than the other zone. In certain embodiments, the permeate zone may have a volume that is less than 1% or essentially 0% of the total vessel volume. For instance, in these embodiments, the membrane may be attached at the bottom opening of a vessel. In one embodiment, the feed zone may have a stirring or agitation device, configured to agitate a contaminated water mixture above the membrane. This agitation device may be an impeller or a magnetic stir bar.

Figure 2:
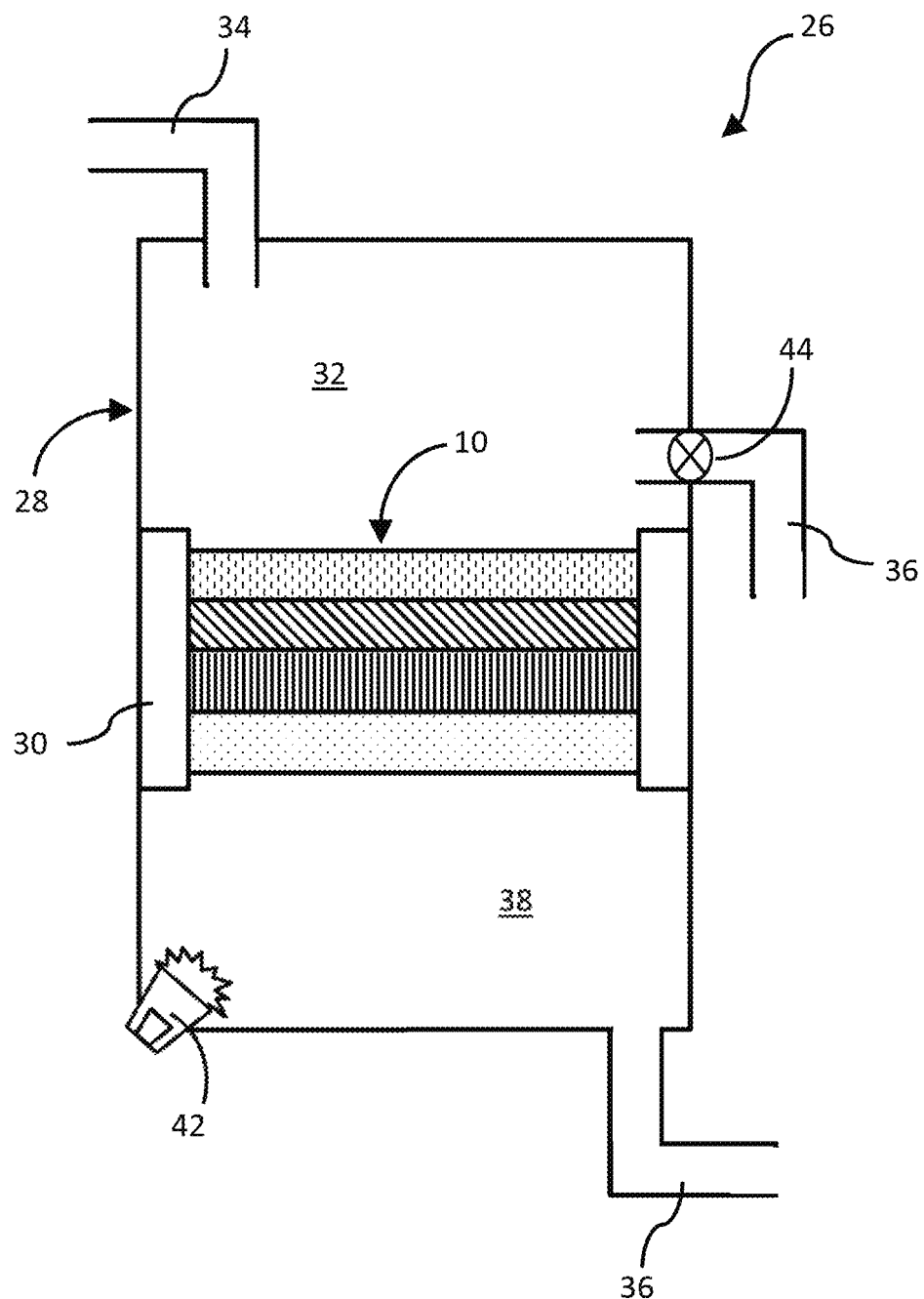
FIG. 2 is a diagram of an oil-water separation system using the oil-water separation membrane.

Preferably, the oil-water separation system 26 is constructed so that the only route for a liquid to flow from the feed zone 32 to the permeate zone 38 is through the membrane 10. In order to permit fluid flow, the feed zone has a feed inlet 34 and the permeate zone has a water outlet 40. For filtering an oil-water mixture, the contaminated water mixture may enter the feed zone through the feed inlet, and water, or a filtered water product, may exit or be rejected from the permeate zone through the water outlet. In one embodiment, the feed zone additionally has an oil outlet 36 to reject solids or liquids, such as oil, that do not pass through the membrane. In one embodiment, the feed inlet, the water outlet, and/or the oil outlet may have a diameter or width that is 1-20%, preferably 2-15%, more preferably 4-12% of the diameter or width of the internal cavity. In one embodiment, the feed inlet and/or water outlet has a diameter or width that is the same as the diameter or width of the internal cavity. For instance, a vessel may be cylindrically shaped with an open top as the feed inlet and an open bottom as the water outlet. A valve 44 may be present on the feed inlet, water outlet, and/or oil outlet to control the flow rate of fluids. FIG. 2 shows a valve 44 on the oil outlet. Examples of valves include, but are not limited to, ball valves, butterfly valves, globe valves, diaphragm valves, and gate valves.

In one embodiment, depending on the scale of the vessel 28 and the flow rate, the feed inlet 34 may distribute a contaminated water mixture across the surface of a membrane 10 by means of tubing, sprinklers, flow channels, or baffles positioned in the feed zone 32. In one alternative embodiment, a single vessel may have two or more membranes arranged sequentially so that a fluid going from the feed inlet to the water outlet 40 has to pass through each membrane. These membranes may have the same composition and properties or may be different from one another.

The oil-water separation system 26 also comprises a UV light source 42 configured to irradiate a UV light to the permeate side coating 24 of the oil-water separation membrane 10. The UV light source may be a mercury or xenon gas discharge lamp, an electric arc, sunlight, a light emitting diode (LED), a laser, a fluorescent lamp, a cathode ray tube, or some other source. In one embodiment, filters, reflectors, collimators, fiber optics, polarizers, and/or lenses may be used to manipulate the light path or properties of the light from the light source. For example, one or more reflectors may be used to focus the light from a mercury gas discharge lamp onto the permeate side coating. Alternatively, a reflector may be positioned on the side of the vessel cavity opposite the light source in order to reflect stray UV light towards the permeate side coating. In one embodiment, two or more light sources may be used, which may be of the same type or different types, and may be positioned on the same side or on different sides of the permeate zone 38. As another example, where sunlight is used as a light source, the sunlight may be filtered, reflected, and focused onto the permeate side coating to increase the proportion of UV light intensity while minimizing heating and radiation from other wavelengths. For instance, a Wood's glass optical filter may be used to allow UV light to pass while blocking other wavelengths. An oil-water separation system may have more than one UV light source.

In one embodiment, the UV light has an intensity of 450-1550 mW/cm$^2$, preferably 600-1400 mW/cm$^2$, more preferably 800-1200 mW/cm$^2$ on the permeate side coating. However, in alternative embodiments, a lower intensity may be used if the flow rate is slowed or if the filtered water product is reapplied to the feed side coating. The UV light source 42 may emit light within the wavelength range of 100-400 nm, preferably 280-395 nm, preferably 350-390 nm. Depending on the composition and morphology of the photocatalyst used, certain UV wavelengths may be more preferable than others. Ideally, the UV wavelength corresponds an energy equal to or greater than the electronic band gap energy of the photocatalyst nanoparticles.

Exposure of photocatalyst nanoparticles to an irradiation of a wavelength corresponding to the band gap energy or a greater energy may cause the photoexcitation of photocatalyst electrons into a conduction band with a corresponding generation of holes in a valence band. The strong reduction power of the electrons and the strong oxidation power of the holes may lead to the decomposition of organic materials, preferably into harmless byproducts, which produces a purified water product. In one embodiment, the photocatalyst nanoparticles may cause other reactions, such as hydrolysis and/or water splitting.

In one embodiment, a UV light source 42 may be placed inside the permeate zone 38, as in FIG. 2. Here, the UV light source may have a waterproof coating or some other protective covering. In another embodiment, a UV light source may be outside the vessel 28 but emit light through the water outlet 40 or permeate zone 38 to the permeate side coating 24. In this embodiment, the membrane may be tilted at an angle of 15-30°, preferably 17-25°, more preferably 18-22° above a horizontal plane, with the feed side coating on top, in order to allow a light source to emit light through the water outlet without being directly underneath the membrane and/or in the flow path of a filtered water product. Alternatively, the membrane may be tiled at an angle greater than 30°. In other embodiments, the membrane may be tilted at an angle for other reasons, such as cleaning or removing a rejected oil fraction. The membrane may attach to the vessel walls at those angles, with the vessel walls positioned vertically, or the membrane may attach to the vessel walls at an angle of 89-91° (as in FIG. 2) and the entire vessel may be tilted at an angle of 15-30°, preferably 17-25°, more preferably 18-22° from a vertical position. In other words, the vessel may or may not need to be tilted or repositioned so that the membrane is tilted at an angle of 15-30° above a horizontal plane.

In one embodiment, a light source may be located outside of the vessel 28, and may transmit UV light through an additional opening in the vessel wall or through a transparent window in the vessel wall. For example, the transparent window may comprise quartz or a polymeric material transparent to UV light such as poly(methyl methacrylate) (also known as PLEXIGLAS). As defined herein, "transparent" refers to an optical quality of a compound wherein a certain wavelength or range of wavelengths of light may traverse through a portion of the compound with a small loss of light intensity. Here, the "transparent window" may causes a loss of less than 10%, preferably less than 5%, more preferably less than 2% of the intensity of a wavelength of UV light. In one embodiment, the vessel wall and transparent window may comprise the same material, for example, a vessel may comprise poly(methyl methacrylate) walls, which may also function as transparent windows. In another embodiment, a vessel wall may have a window that is partially transparent to UV light, for instance, a window comprising soda lime glass.

Where a UV light source 42 emits heat, a part of the oil-water separation system 26 may be temperature-regulated to prevent overheating and/or evaporation, for example, by water tubing, a water and/or ice bath, ice packs, heat sinks, or by air cooling. In a related alternative embodiment, the performance of the membrane 10 is temperature dependent, with the membrane filtering with higher efficiency at higher temperatures. Therefore, a part of the oil-water separation system 26 may be heated. For example, the vessel 28 may be covered with a heating blanket or a jacket fluidly connected to a heating circulator. In another embodiment, heat from the UV light source may also serve the purpose of heating the vessel or membrane. The membrane may filter most effectively at a temperature of 16-80° C., preferably 20-70° C., more preferably 22-60° C.

In an alternative embodiment, a feed side coating and a porous support may both be fully or partially transparent to UV radiation, so that the permeate side coating may be irradiated from a light source from the feed zone side.

Devices to measure and record the physical and/or chemical properties of a contaminated water mixture and/or a filtered water product may be fluidly connected to the feed inlet 34, the water outlet 40, the feed zone 32, or the permeate zone 38. Examples of these devices include, but are not limited to, pressure gauges, flowmeters, conductivity meters, pH meters, temperature sensors, and spectrophotometers. Recorded data from a device may allow a user skilled in the art to calculate parameters, such as efficiency, product recovery, permeate flux, oil rejection, and pressure drop across the membrane. The user may then replace the membrane 10 with a second membrane to evaluate the aforementioned parameters for the second membrane. It is envisioned that the method for comparing two membranes can be extended to a plurality of membranes. In addition, it is envisioned that the membranes can differ in the aforementioned shapes, aforementioned thicknesses, and aforementioned materials. In a preferred embodiment, the membranes have the same shape and thickness, but have different materials.

According to a third aspect, the present disclosure relates to a method of producing a purified water product from a contaminated water mixture comprising an oil phase and an aqueous phase having an organic aqueous pollutant with the oil-water separation system 26 of the second aspect. In one embodiment, the contaminated water mixture may come from petroleum extraction or processing. In other embodiments, the contaminated water mixture may come from an ocean, a bay, a river, a lake, a swamp, a pond, a pool, a fountain, a bath, an aquarium, a water treatment plant, a sewage treatment plant, a desalination plant, a manufacturing plant, a chemical plant, a textile plant, a power plant, a gas station, a food processing plant, a restaurant, a dry cleaners, or some other place that may generate contaminated water mixtures, or contaminated oil-water mixtures. In some embodiments, the oil-water mixture may be in the form of an emulsion.

The contaminated water mixture may comprise an oil (as defined earlier) or some other non-polar liquid phase at a volume percent concentration of 0.5-50%, preferably 2-40%, more preferably 4-30% relative to a total volume of the contaminated water mixture. The non-polar liquid phase may be emulsified or dispersed throughout the contaminated water mixture, may float at the top of the contaminated water mixture, or some combination of both. In an alternative embodiment, the contaminated water mixture may not contain oil or a non-polar liquid phase.

The contaminated water mixture may also comprise an aqueous phase at a volume percent concentration of 50-99.5%, preferably 60-98%, more preferably 70-96% relative to a total volume of the contaminated water mixture. The aqueous phase may comprise one or more organic pollutants dissolved or dispersed within water. The organic contaminant may be an herbicide, a fungicide, a pesticide, a pharmaceutical compound, a steroid, a microbial toxin, a metabolite, a disinfection byproduct, an arsenic-containing compound, a food byproduct, a dye, or some other organic molecule. Preferably the contaminant is one or more unwanted compounds known to be persistent in produced water from petroleum extraction or as an environmental pollutant.

Where the organic pollutant is a dye, the dye may be an azin dye, an azo dye, a diarylmethane dye, a fluorescent dye, a food coloring, a fuel dye, an ikat dye, an indigo structured dye, an indophenol dye, a perylene dye, a phenol dye, a quinoline dye, a rhodamine dye, a solvent dye, a staining dye, a thiazine dye, a thiazole dye, a triarylmethane dye, a vat dye, a violanthrone dye, or some other type of dye. In a preferred embodiment, the dye may be a thiazine dye, in particular, methylthioninium chloride (methylene blue).

The organic pollutant may be present in the aqueous phase at a concentration of 0.1 mg/L-100 mg/L, preferably 0.5 mg/L-50 mg/L, more preferably 1.0 mg/L-10 mg/L, though in other embodiments, the organic pollutant may be present in the aqueous phase at concentrations less than 0.1 mg/L or greater than 100 mg/L. In an alternative embodiment, no organic pollutant is present, and the aqueous phase contains only water. In some embodiments, the aqueous phase may be a brine, or comprise sea water or salt water.

The contaminated water mixture may or may not be pre-processed, for instance, by filtering through a coarse filter to remove large particulate matter, or by exposure to UV light or ozone. In an alternative embodiment, the membrane 10 or oil-water separation system 26 may be used to separate oil from a contaminated mixture that is mostly oil. For instance, the membrane or oil-water separation system may be used to remove the aqueous phase from spent cooking oil prior to processing the spent cooking oil into biofuel or other products.

The method of producing the purified water product with the oil-water separation system 26 first involves contacting the contaminated water mixture with the feed side coating 18 of the oil-water separation membrane, wherein the aqueous phase permeates through the oil-water separation membrane 10 and into the permeate side coating 24, leaving a retained oil phase in the feed ozone 32. In one embodiment, the retained oil phase is more than 90%, preferably more than 95%, more preferably more than 99%, even more preferably more than 99.5% of the total weight of the oil phase in the contaminated water mixture before the contacting. The contaminated water mixture may be added to the feed ozone by pouring, pumping, or siphoning through the feed inlet 34.

In one embodiment, a pressure difference across the membrane 10 is 0-5 kPa, preferably 0-4 kPa, more preferably 0-3 kPa. Here, the pressure difference may be created solely by the weight of the contaminated water mixture on the feed side coating 18, meaning that the filtration is gravity driven. For instance, a layer of water having a height of 5 cm above a membrane exerts a pressure of 0.49 kPa on the membrane due to the weight of the water, and if this layer of water passes through the membrane without requiring other pressure, the filtration is considered to be gravity driven. The height of the water mixture may extend through the feed inlet and higher than the feed zone. Alternatively, the pressure difference may be created by a pump, a vacuum pump, a piston, a compressed gas, centrifugation, evaporation, or water jet aspiration In a further embodiment, the pressure difference is 0-1 kPa, preferably 0-0.9 kPa, more preferably 0-0.8 kPa, and the aqueous phase permeates through the membrane 10 at a flow speed of 0.5-5.0 mm/s, preferably 0.7-4.0 mm/s, more preferably 1.0-3.0 mm/s. Here, the pressure difference is similar to 10.2 cm or less of $H_2O$ sitting on the feed side coating 18 without external pressure applied. In this arrangement, the feed side coating is on the top of the membrane, with the membrane positioned horizontally or tilted at an angle up to 30° from a horizontal position. Despite this low pressure, the hydrophilicity of the feed side coating enables the flow of the aqueous phase through the membrane. In some embodiments, a 1 cm or 0.5 cm thick layer of an aqueous phase from a contaminated water mixture may be drawn through the membrane without the application of external pressure.

As the aqueous phase permeates through the membrane 10, the permeate side coating 24 is irradiated with UV light to photo-catalytically degrade a portion of the organic aqueous pollutant present in the aqueous phase in order to produce a purified water product. As mentioned previously, the UV light may have an intensity of 450-1550 mW/cm$^2$, preferably 600-1400 mW/cm$^2$, more preferably 800-1200 mW/cm$^2$ on the permeate side coating 24. The portion of the organic aqueous pollutant degraded may be 10-60 wt %, preferably 15-55 wt %, more preferably 20-50 wt % of the total weight of the organic aqueous pollutant. However, in some embodiments, depending on the identity and concentration of the organic aqueous pollutant, the UV wavelength and intensity, and other parameters known to one skilled in the art, the portion of the organic aqueous pollutant degraded may be greater than 60 wt %. Preferably the UV light comes from one or more UV light sources of the oil-water filtration system as previously discussed. In one embodiment, the UV light has an energy equivalent to or greater than the band gap energy of the photocatalyst nanoparticle. In one embodiment, the UV light may degrade contaminants by direct irradiation, rather than through a reaction with the photocatalyst nanoparticle.

In alternative embodiments, the membrane 10 may be positioned vertically with the feed side coating 18 on the side, horizontally with the feed side coating on the bottom, or at some angle between those two positions. A membrane with the feed side coating on the bottom may be attached to a U-shaped feed zone or water inlet, so that the filtering may be gravity driven. In these alternative embodiments, the permeate side coating 24 of the membrane may be more easily exposed to a UV light source, for example, sunlight.

In one embodiment, the total filtered water product comprises the organic contaminant at a concentration that is 40-90 wt %, preferably 45-85 wt %, more preferably 50-80 wt %, of the concentration of the organic contaminant in the aqueous phase before the contacting or filtering. The reduction in organic contaminant may be measured by spectroscopic, electrochemical, or gravimetric analysis of the filtered water product, or by other means, such as a colorimetric assay. In one embodiment, the contaminant concentration is measured by taking UV-Vis absorption measurements in the wavelength range 200-700 nm, preferably 400-690 nm, more preferably 580-680 nm.

The membrane 10 or the oil-water separation system 26 may be used with contaminated water to remove or reduce microbes (such as fungi and sulfate-reducing bacteria), fouling agents, biofouling agents, phenolic compounds, oil emulsions, heavy metals (such as chromium (VI)), and inorganic compounds such as arsenic, mercury, and silver. The membrane or the oil-water separation system may be expanded to industrial scale filtration, including that which may use solar irradiation as the source of UV light.

In one embodiment, the method further comprises draining the retained oil phase from the feed zone 32. In one embodiment, the retained oil phase may be drained or removed by tilting or inverting the vessel 28. In other embodiments, the oil may be adsorbed by a medium inserted into the feed zone 32, or the oil may be burned. Where the feed zone has an oil outlet 36, the oil outlet may transport oil away from the membrane by gravity or by pumping. In one embodiment, the interface of an oil outlet with the feed zone may be covered with a hydrophobic and oleophilic membrane to allow an oil phase to pass while rejecting an aqueous phase. In one embodiment, the filtration and/or oil draining may occur continuously. In another embodiment, the filtration and/or oil draining may occur intermittently or periodically, as in a batch operation.

The method may also involve reapplying the purified water product to the feed side coating 18. In one embodiment, reapplying the purified water product once (for two filtrations total) results in a 30-50%, preferably a 35-45%, more preferably a 37-43% reduction in a concentration of the organic contaminant in the aqueous phase as compared to a concentration of the organic contaminant in the aqueous phase before the contacting. A purified water product may continue to be reapplied to the membrane 10 to further remove the organic contaminant or other contaminants. In addition, reapplying a purified water product may further remove any oil phase that has passed through the membrane.

In one embodiment, the reapplying is done at least 9 times to produce a purified water product having at least a 99% reduction, preferably at least a 99.5% reduction, more preferably at least a 99.9% reduction in a concentration of the organic contaminant compared to a concentration of the organic contaminant in the aqueous phase before the contacting.

In another embodiment, the reapplying is done at least 9 times and at least 99 wt %, preferably at least 99.5 wt %, more preferably at least 99.9 wt %, even more preferably at least 99.99 wt % of the total oil phase, relative to a total weight of the oil phase in the contaminated water mixture, is retained as the retained oil phase.

In one embodiment, filtering a contaminated water mixture through the membrane 10 to produce a filtered water product, or refiltering a filtered water product, does not change the hydrophilicity and/or oleophobicity of the membrane. In one embodiment, the membrane may be cleaned by a chemical reagent such as solvent, surfactant, or enzymes, and/or by backwashing to remove fouling agents. In one embodiment, nanoparticles, photocatalyst nanoparticles, surfactant, and/or adhesive may be redeposited on the first and/or second side of a used membrane. In an alternative embodiment, rather than reapplying a filtered water product to the same membrane, a filtered water product may be directed to pass through one or more identical or similar membranes, with or without UV light irradiation.

The examples below are intended to further illustrate protocols for characterizing and using the oil-water separation membrane, and are not intended to limit the scope of the claims.

Example 1

Figure 3A:
FIG. 3A shows contact angles of water or oil on an uncoated glass substrate.
Figure 3B:
FIG. 3B shows contact angles of water or oil on a coated glass substrate.
Figure 3C:
FIG. 3C shows contact angles of water or oil on an uncoated wire mesh.
Figure 3D:
FIG. 3D shows contact angles of water or oil on a coated wire mesh.
Figure 4A:
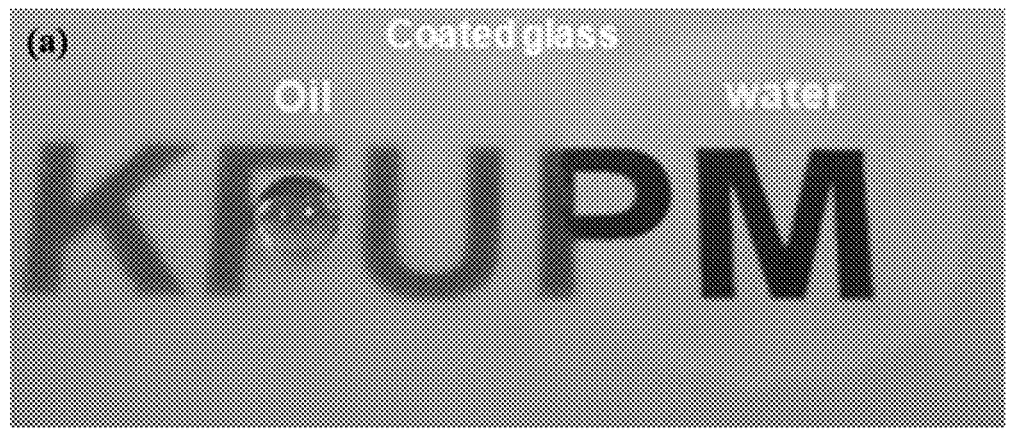
FIG. 4A shows the effect of adding a drop of oil and a drop of water to a coated glass substrate.
Figure 4B:
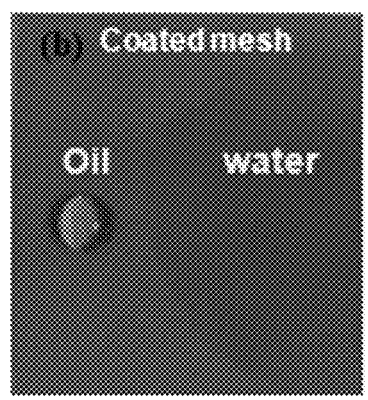
FIG. 4B shows the effect of adding a drop of oil and a drop of water to a coated mesh substrate.
Figure 4C:
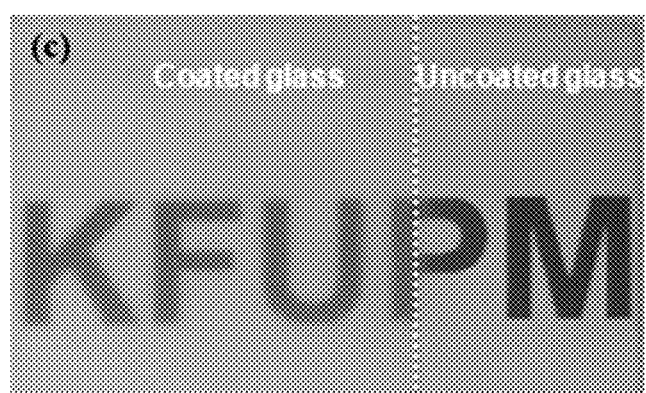
FIG. 4C shows the difference in light transmission for coated versus uncoated glass.

Wettability of Uncoated Glass, SSF Coated Glass, Uncoated Membrane, and SSF Coated Membrane To evaluate the wettability of our coating $SiO_2$/SF-100/FS-50 (SSF) on glass and stainless steel mesh, we measured contact angles for water and hexadecane, as shown in FIGS. 3B and 3D. For comparison, we measured contact angles for water and hexadecane on an uncoated glass (FIG. 3A) and on a stainless steel mesh (FIG. 3C). It is clear that the uncoated glass is superhydrophilic ($\theta_{wa}=0°$) and superoleophilic ($\theta_{oa}=0°$) in an air environment, while uncoated stainless steel membrane is slightly hydrophobic ($\theta_{wa}=80°$) and superoleophilic ($\theta_{oa}=0°$) in an air environment. However, the SSF coated glass is superhydrophilic ($\theta_{wa}=0°$) and superoleophobic ($\theta_{oa}=155°$), and the SSF coated membrane is also superhydrophilic ($\theta_{wa}=0°$) and superoleophobic ($\theta_{wa}=153°$) in an air environment. In-air superhydrophilicity and superoleophobicity of the SSF coated membrane and the SSF coated glass indicate that the surface wettability of the SSF coated membrane has potential for oil-water separation solely under the influence of gravity. FIGS. 4A-4C show photographs of a droplet of rapeseed oil (dyed red) and water on the SSF coated glass and membrane. We can see that, for both the SSF coated glass and the SSF membrane, water spreads while the oil droplet retains a spherical shape in an air environment, indicating that a SSF coated surface has potential for oil-water separation applications.

Example 2

Surface Morphology of Uncoated and SSF Coated Membrane

Figure 5A:
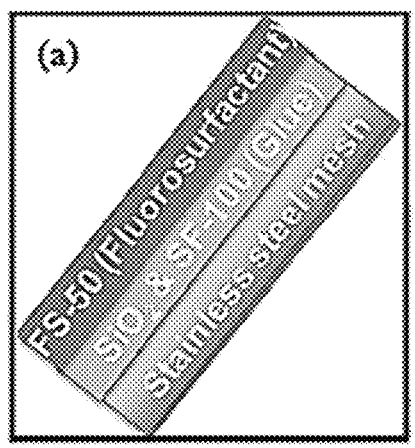
FIG. 5A is a schematic of the membrane coating without a photocatalyst layer (SSF) for oil-water separation.
Figure 5B:
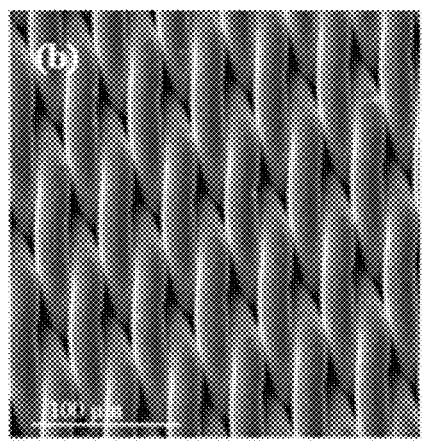
FIG. 5B is an FE-SEM image of an uncoated wire mesh, scale bar 100 μm.
Figure 5C:
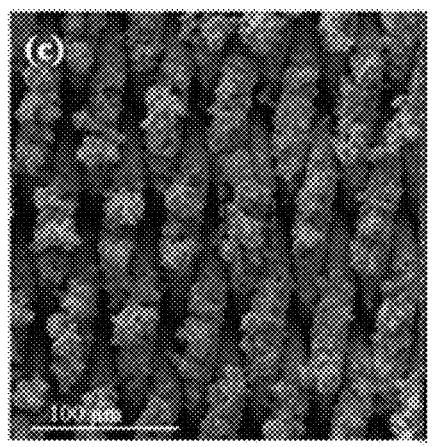
FIG. 5C is an FE-SEM image of a coated wire mesh, with the coating as in FIG. 5A, scale bar 100 μm.

The surface morphology of the uncoated stainless steel mesh and the SSF coated stainless steel membrane was investigated by Field Emission Scanning Electron Microscopy (FE-SEM). FE-SEM images of uncoated stainless steel mesh and SSF coated membrane are shown in FIGS. 5A-5F. FIG. 5B shows the microporous morphology of the uncoated stainless steel mesh with 2 µm pore size. The surface morphology of the SSF coated membrane (FIG. 5C) is different from the uncoated stainless steel mesh (FIG. 5B). $SiO_2$ nanoparticles can be clearly visualized as granular structures affixed to the microporous stainless steel mesh.

Figure 5D:
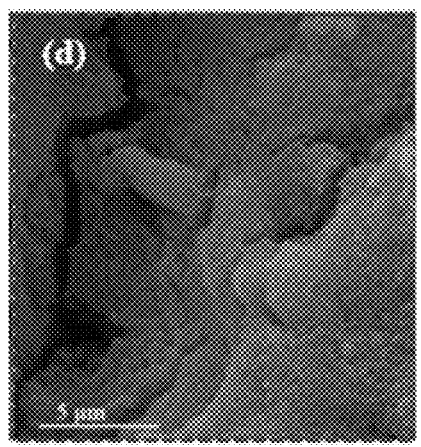
FIG. 5D is another FE-SEM image of the coated wire mesh, scale bar 5 μm.
Figure 5E:
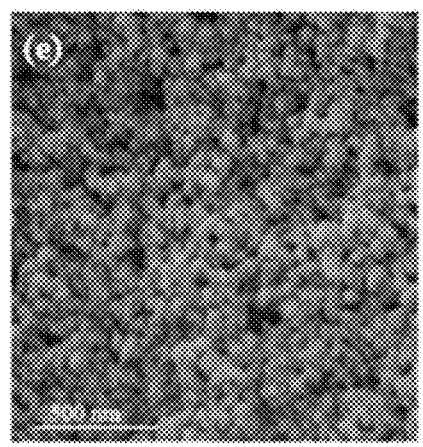
FIG. 5E is another FE-SEM image of the coated wire mesh, scale bar 500 nm.
Figure 5F:
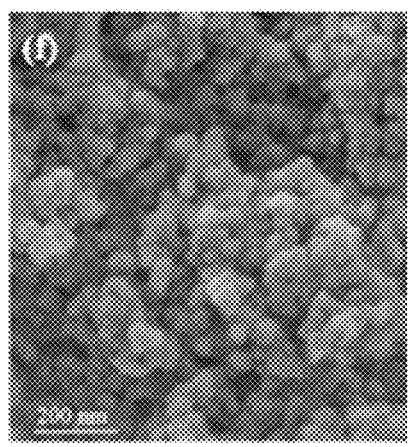
FIG. 5F is another FE-SEM image of the coated wire mesh, scale bar 200 nm.

The higher magnification FE-SEM images of the SSF coated membrane presented in FIGS. 5D-5F show that the SSF coating has both micro and nanoscale surface roughness. This surface roughness is crucial for controlling surface wettability.

Example 3

Figure 6A:
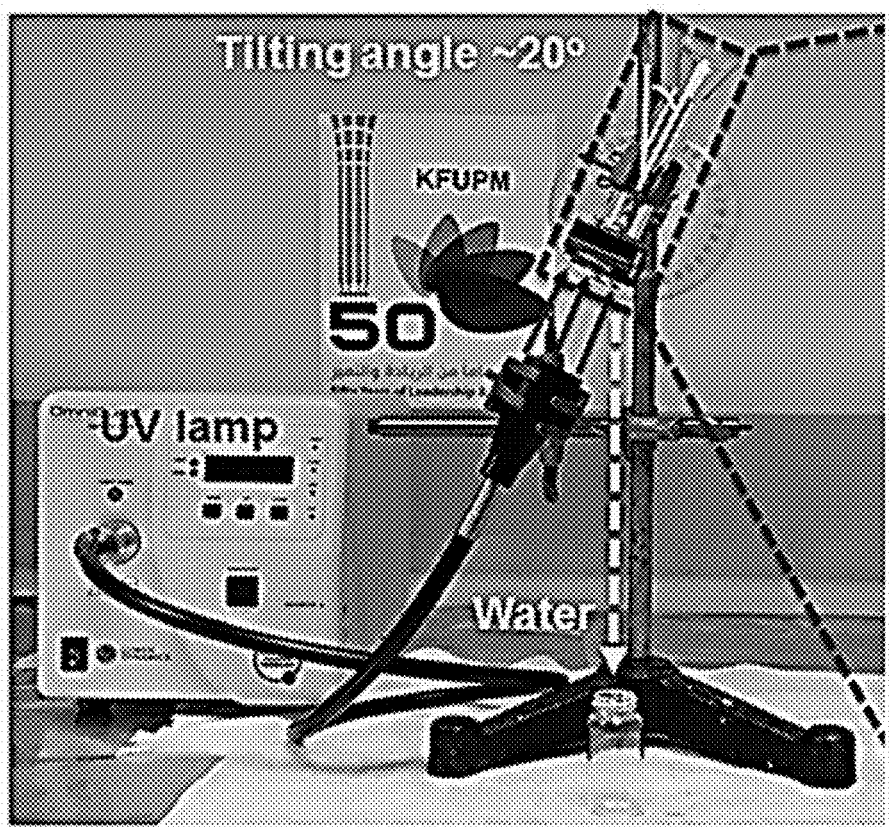
FIG. 6A is the filtering apparatus used for filtering a contaminated oil-water mixture using the membrane and a UV light source.
Figure 6B:
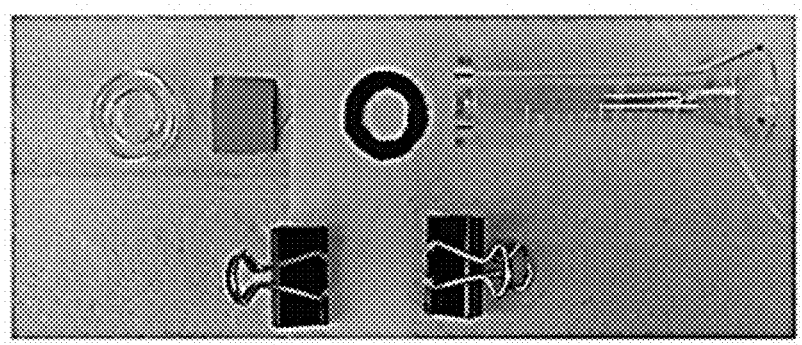
FIG. 6B shows the disassembled filtering apparatus of FIG. 6A.

Laboratory Made Apparatus for Oil-Water Separation and Simultaneous Removal of Organic Pollutants The laboratory made apparatus that was used for oil-water separation and simultaneous removal of organic pollutants is shown in FIGS. 6A and 6B. The coated membrane was sandwiched between a glass tube and an acrylic ring. The glass tube and the acrylic ring coupling were held together by binder clips. Oil resistant rubber O-rings were used to prevent leaks from the coupling as shown in FIG. 6B. The separation apparatus was tilted by 20 degrees with respect to the vertical axis to irradiate the photocatalytic surface of the membrane with UV light while protecting the optics from water.

Example 4

In-Air Oil-Water Separation Performance of SSF Coated Membrane

Figure 7A:
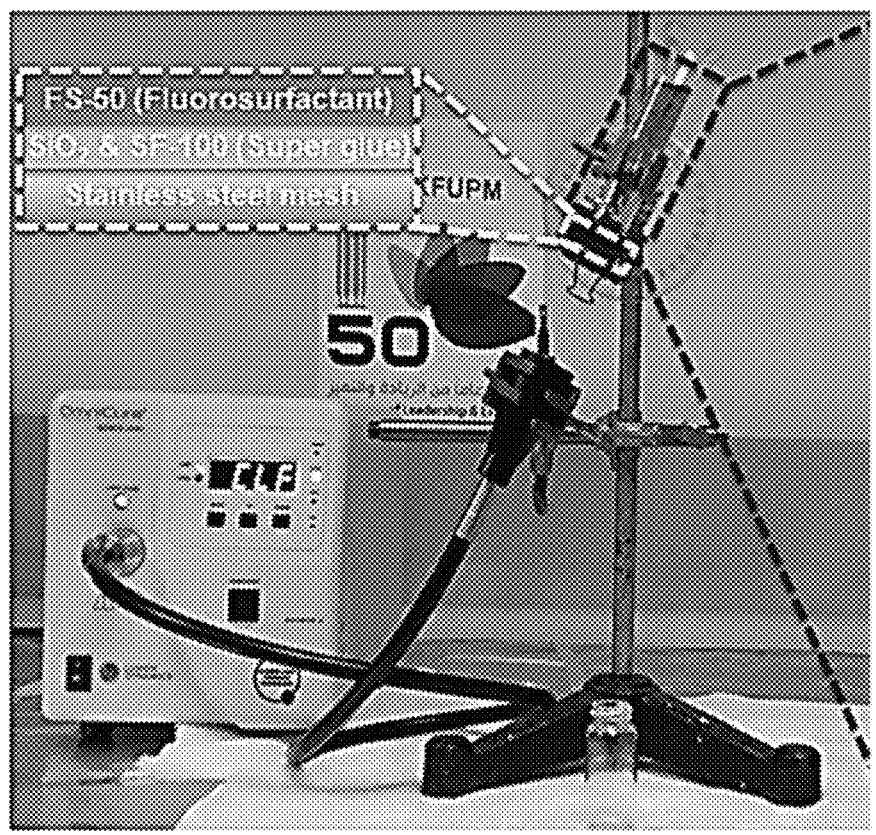
FIG. 7A shows the apparatus for filtering a contaminated oil-water mixture using a membrane without a photocatalyst layer (SSF) and without UV light irradiation.
Figure 7B:
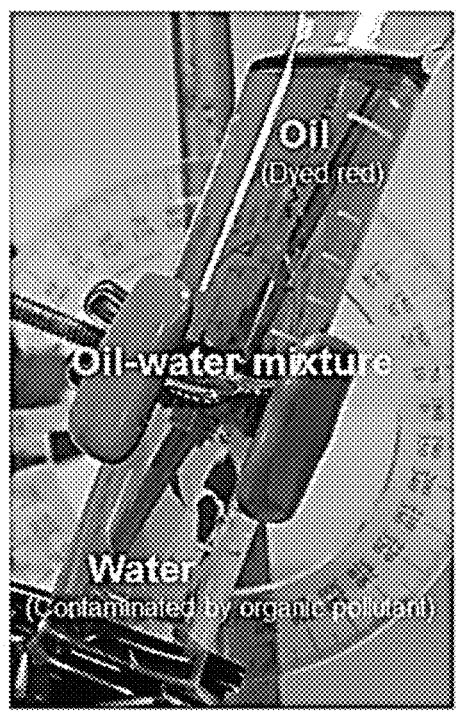
FIG. 7B shows a zoomed in view of the oil-water mixture in the apparatus of FIG. 7A.
Figure 8A:
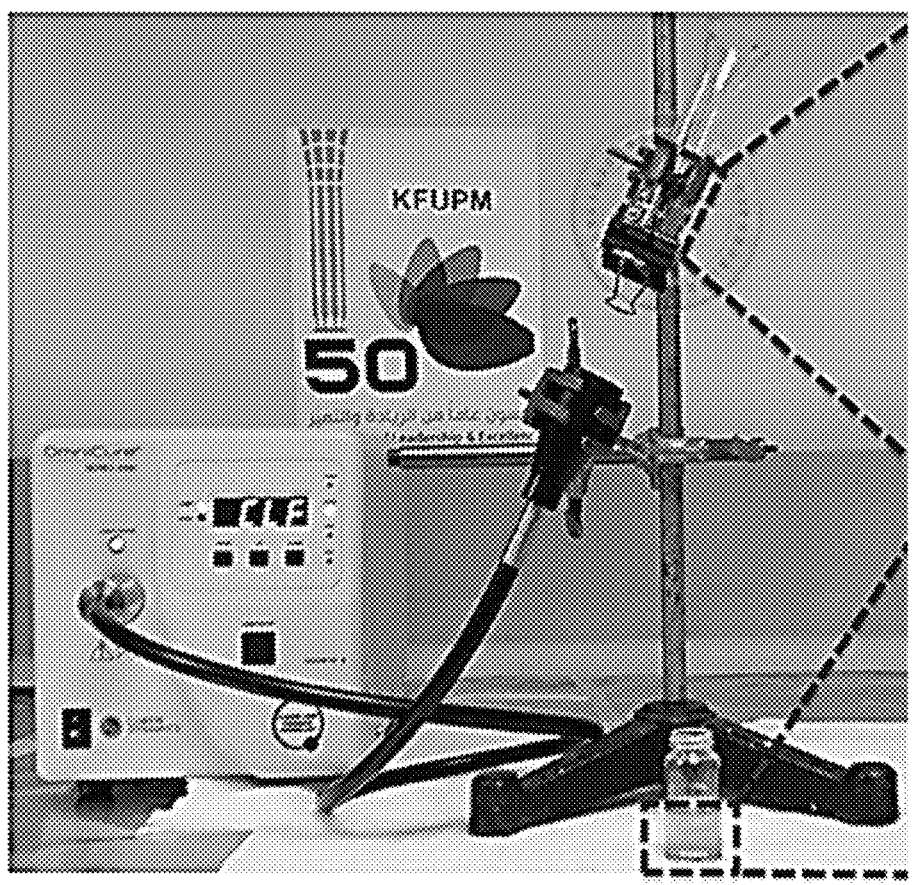
FIG. 8A shows the apparatus of FIG. 7A, after the filtering.
Figure 8B:
FIG. 8B is a zoomed in view of the water-free oil phase left above the membrane in FIG. 8A.
Figure 8C:
FIG. 8C is a zoomed in view of FIG. 8A, showing the oil-free water below the apparatus, containing the aqueous organic pollutant.

Oil-water separation experiments were carried out to examine the performance of the SSF coated membrane for separating the water phase from the oil-water mixture. Here we used hexadecane as a representative oil. For ease of visualization, hexadecane was dyed red and water was colored with methylene blue dye, a dye which has negligible solubility in hexadecane. As shown in previous subsections, the SSF coated membrane has great potential to separate oil-water mixtures due to its in-air superhydrophilic and superoleophobic behavior. An oil-water mixture was poured onto the SSF coated membrane as shown in FIGS. 7A and 7B. As a result of the exceptional in-air superhydrophilic and superoleophobic behavior of the SSF coated membrane, oil was retained by the coated membrane, while water penetrated through the coated membrane as shown in FIGS. 8A-8C. No noticeable oil was seen in the water which had permeated through the membrane (FIG. 8C), demonstrating high quality and sustainable oil-water separation from the oil-water mixture. The results of oil-water separation were also confirmed using thermogravimetric analysis (TGA). The entire oil-water separation procedure was finished in a couple of minutes.

Example 5

Robustness Measurement of SSF Coated Glass and SSF Coated Membrane

Figure 9:
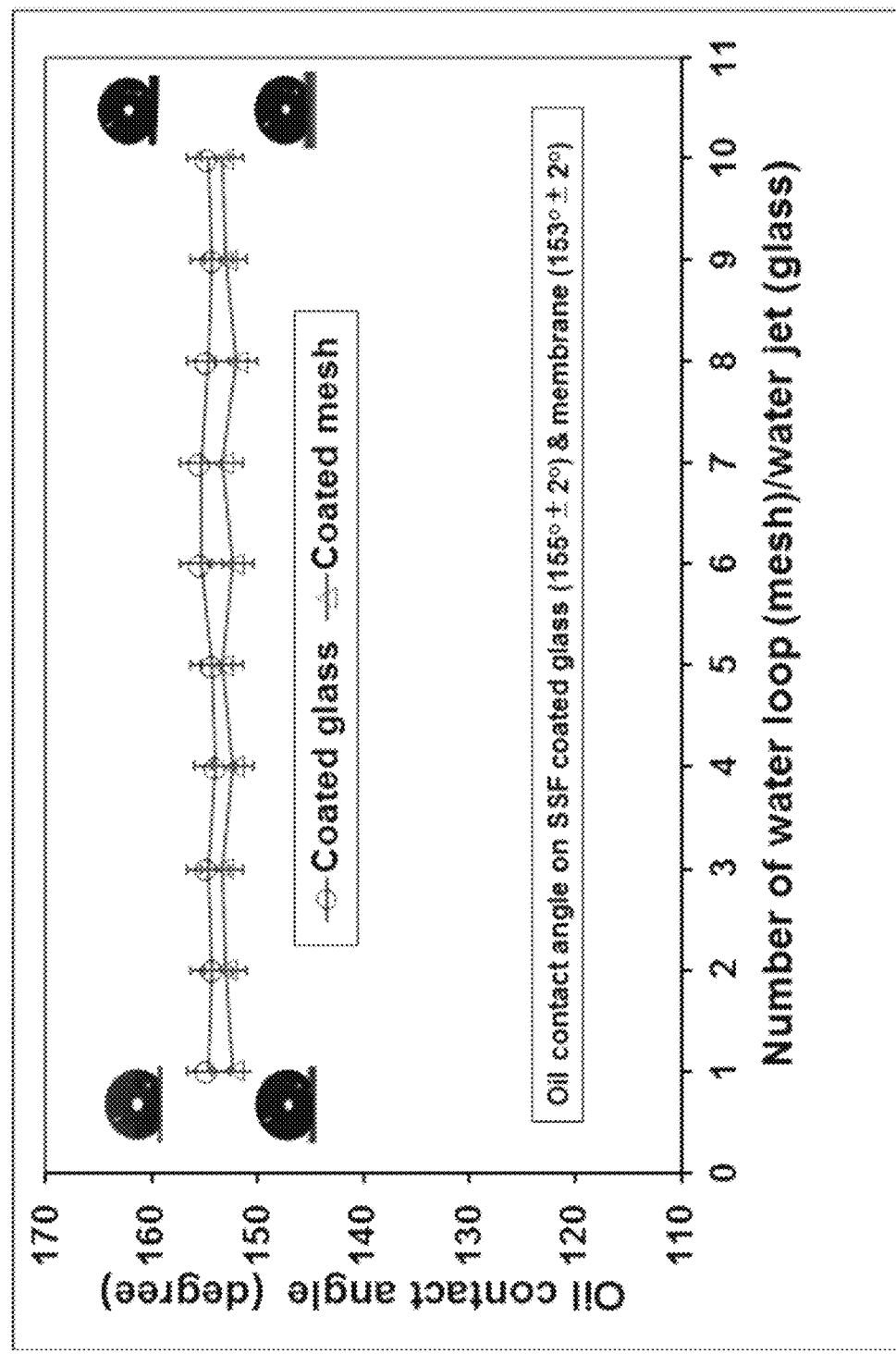
FIG. 9 shows the contact angles of oil on the oil-water separation membrane without the photocatalyst layer, or on a coated glass substrate, after a number of water applications.

The robustness of the SSF coated glass/membrane was measured by observing the oil contact angle vs. the number of water loops/water jets. Water loop refers to the number of times water was added to the coated membrane while water jet refers to the number of sprays of deionized water onto the surface of the coated glass using a laboratory spray bottle (500 mL, Scienceware, Bel-Art). FIG. 9 shows the results of the robustness test for SSF coated glass and SSF coated membrane. It is clear that the SSF coating is robust having an almost constant contact angle 153°±2 and 155°±2 for coated membrane and glass after 10 water loops and 10 water jets, respectively.

Example 6

Surface Morphology of $TiO_2$ Coated Membrane

Figure 10A:
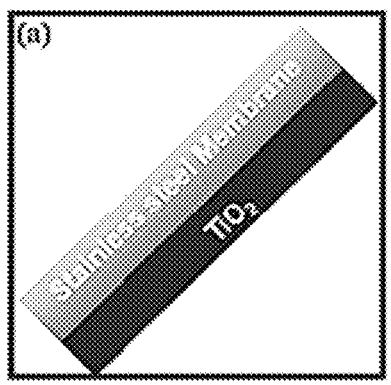
FIG. 10A is a schematic of the membrane coating comprising only the wire mesh and the photocatalyst nanoparticles ($TiO_2$).
Figure 10B:
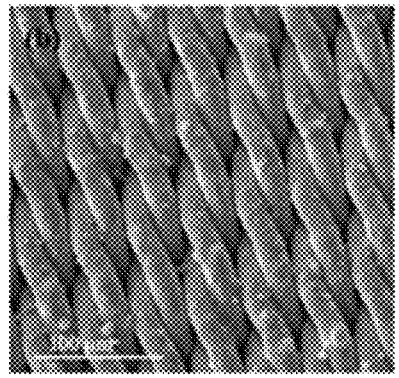
FIG. 10B is an FE-SEM image of a coated wire mesh, with the coating as in FIG. 10A, scale bar 100 μm.
Figure 10C:
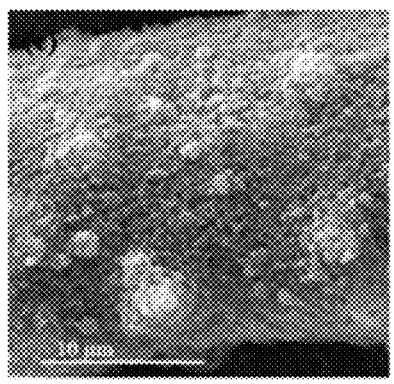
FIG. 10C is another FE-SEM image of the coated wire mesh, scale bar 10 μm.
Figure 10D:
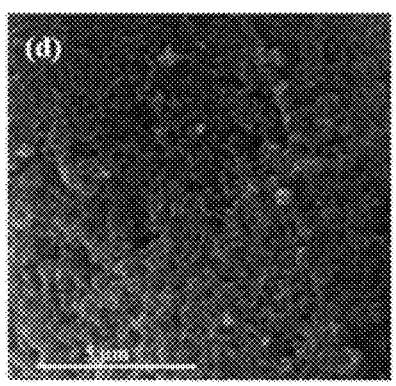
FIG. 10D is another FE-SEM image of the coated wire mesh, scale bar 5 μm.
Figure 10E:
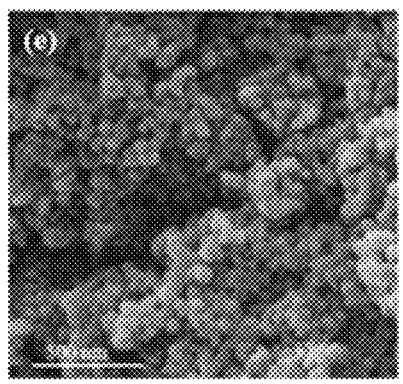
FIG. 10E is another FE-SEM image of the coated wire mesh, scale bar 500 nm.
Figure 10F:
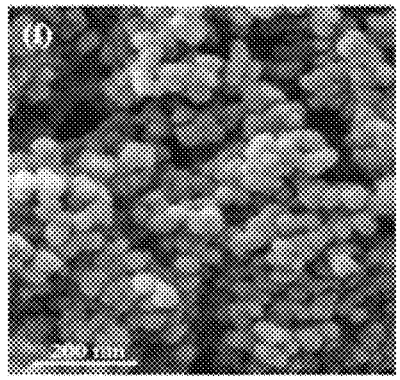
FIG. 10F is another FE-SEM image of the coated wire mesh, scale bar 200 nm.

The surface morphology of the $TiO_2$ coated membrane (FIG. 10A) was investigated by FE-SEM. FE-SEM images of a $TiO_2$ coated membrane are shown in FIGS. 10B-10F. The higher magnification FE-SEM images of the $TiO_2$ coated membrane, presented in FIGS. 10E and 10F, show that the $TiO_2$ coating has micro- and nano-surface morphology with a line particle distribution and a high surface area, which are all properties suitable for photo-degradation of organic pollutants.

Example 7

Figure 11A:
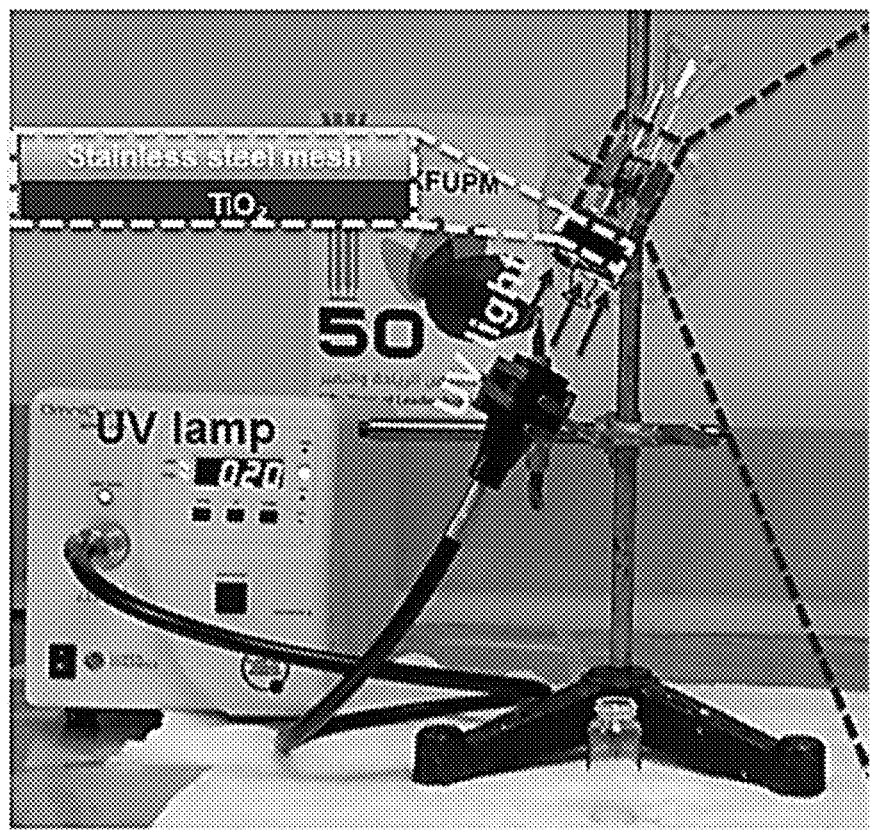
FIG. 11A shows the apparatus for filtering a contaminated water mixture using a membrane of a wire mesh and a photocatalyst layer with UV light irradiation.
Figure 11B:
FIG. 11B shows a zoomed in view of the contaminated water mixture in the apparatus of FIG. 11A.
Figure 12A:
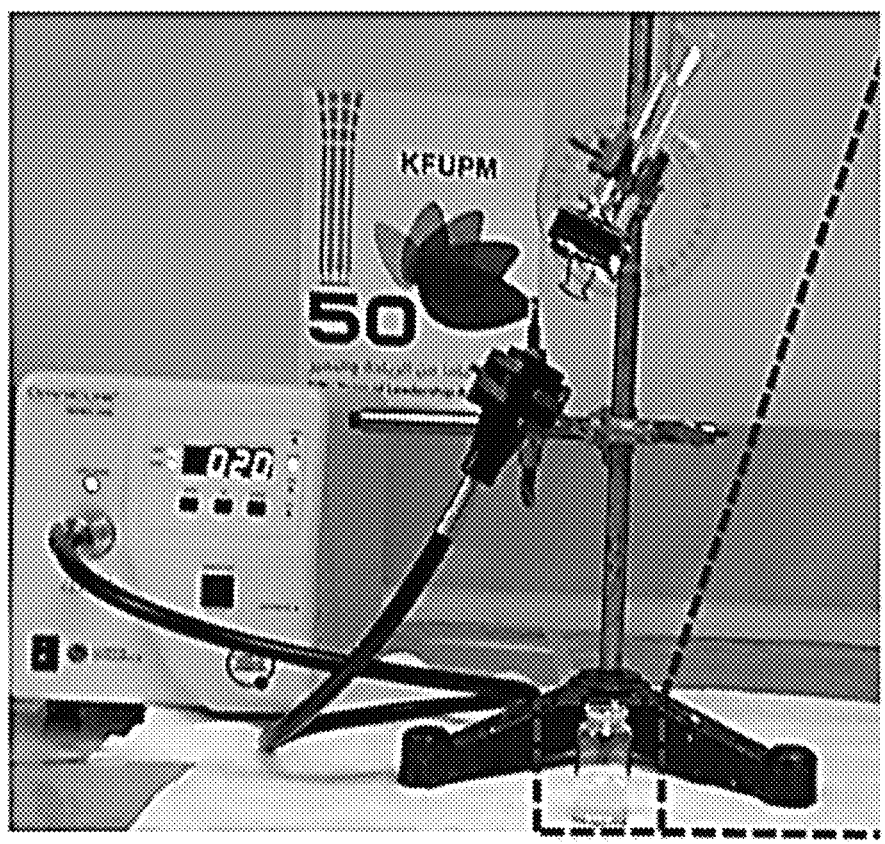
FIG. 12A shows the apparatus of FIG. 11A, after the filtering.
Figure 12B:
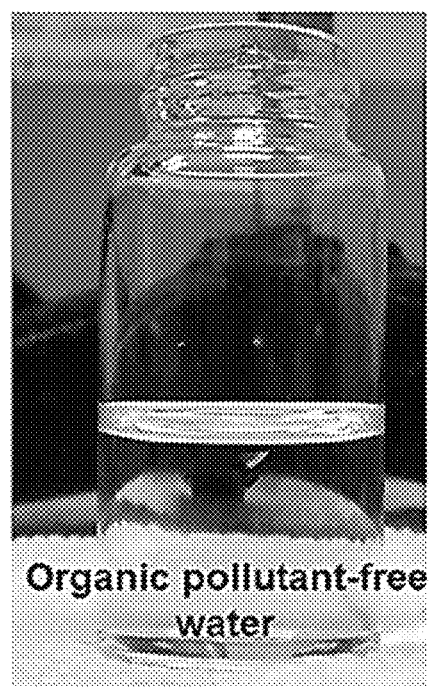
FIG. 12B is a zoomed in view of FIG. 12A, showing the organic pollutant-free water below the apparatus.
Figure 13:
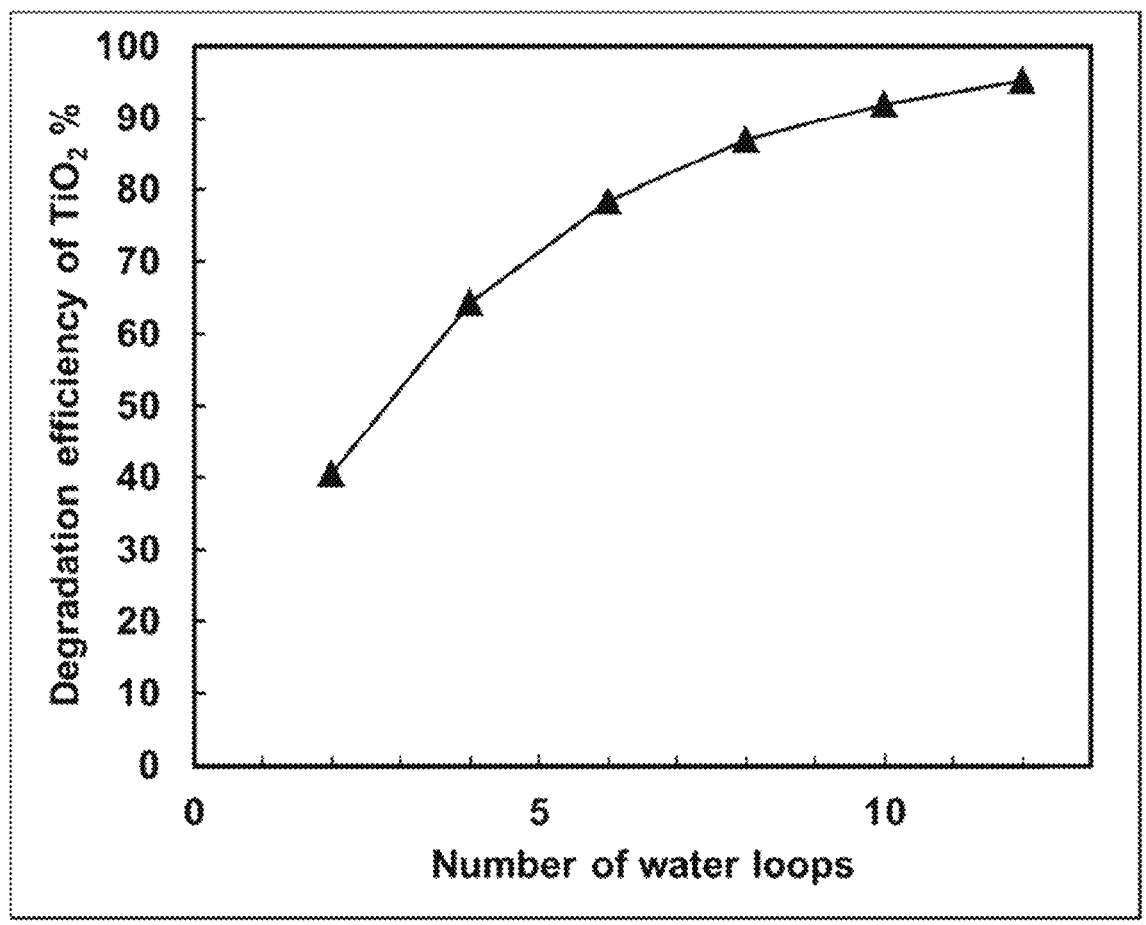
FIG. 13 shows the degradation efficiency of a $TiO_2$ coated membrane on an organic pollutant upon multiple filter passes at a constant UV light intensity.
Figure 14:
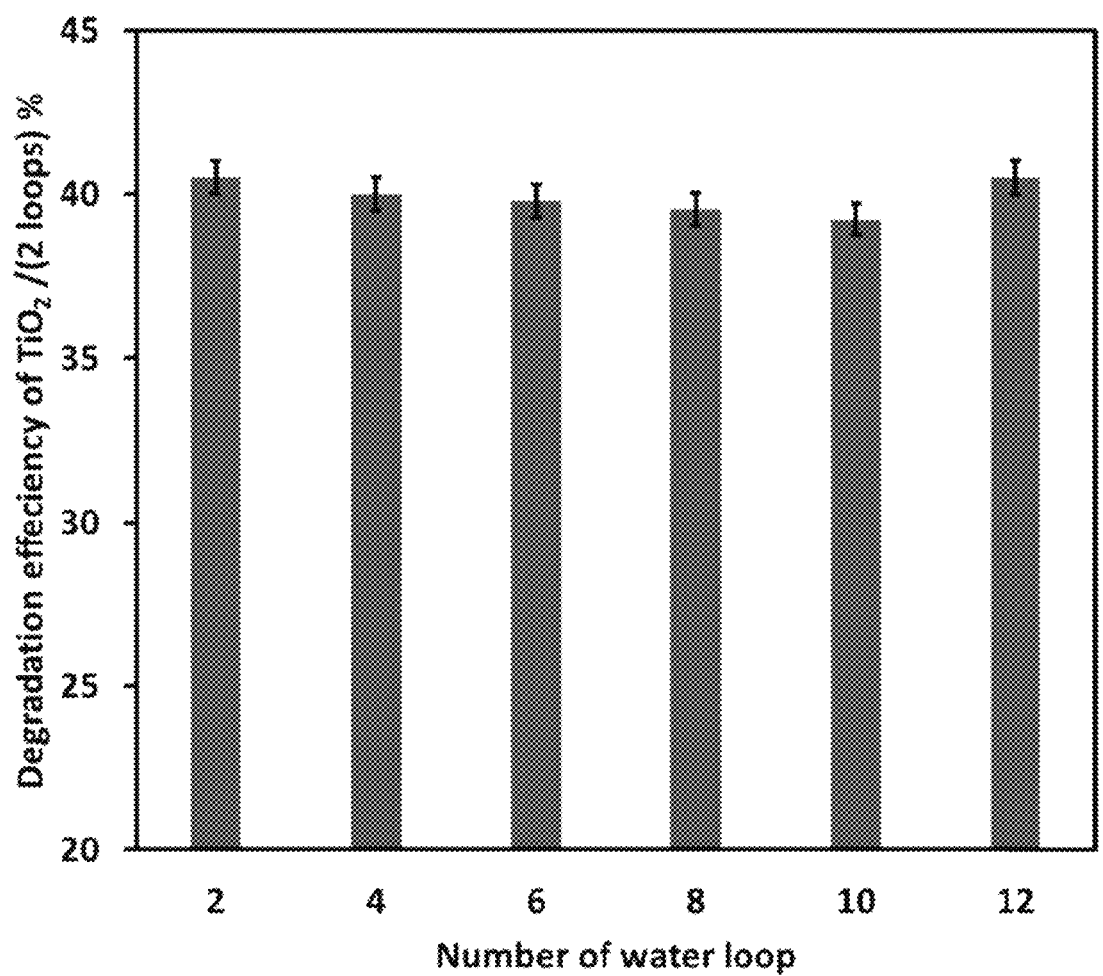
FIG. 14 shows the degradation efficiency of a $TiO_2$ coated membrane on an organic pollutant for two passes through the filter at a constant UV light intensity for six consecutive samples.
Figure 15:
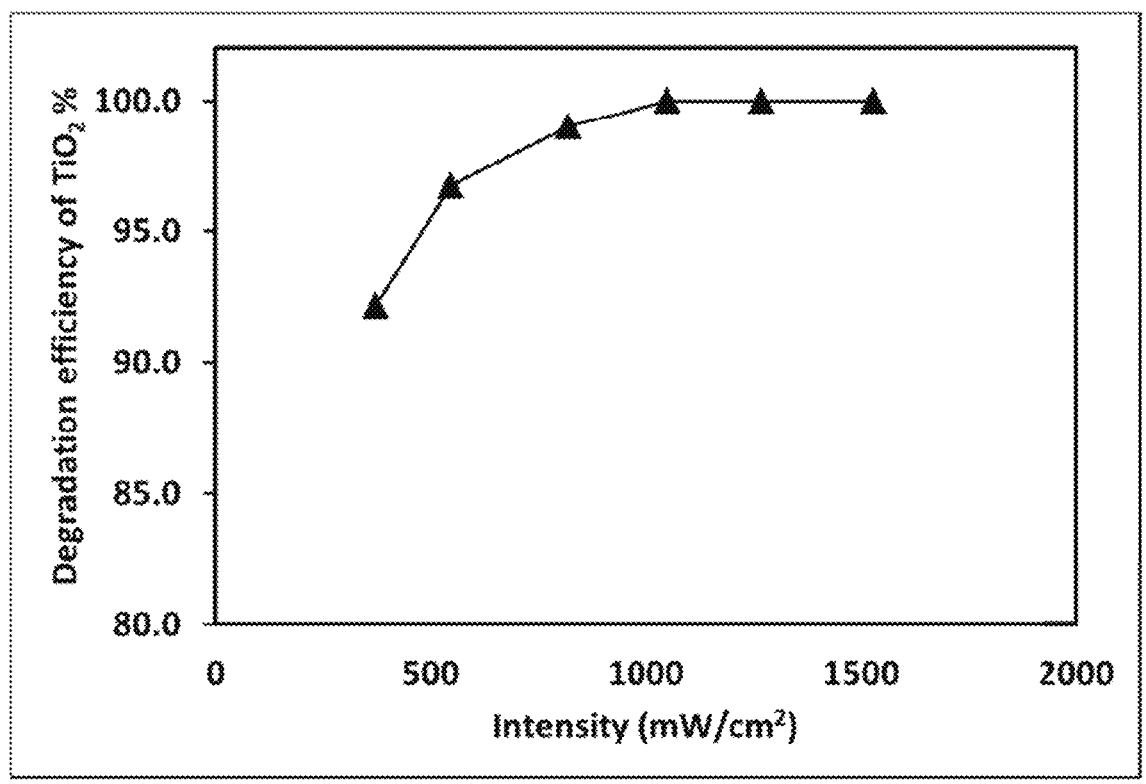
FIG. 15 shows the degradation efficiency of a $TiO_2$ coated membrane on an organic pollutant for a constant number of water loops as a function of different UV light intensities.

Photo-Degradation Performance of Methylene Blue Dye Using $TiO_2$ Coated Membrane FIGS. 11A, 11B, 12A, and 12B show the photo-degradation performance of the $TiO_2$ coated membrane on methylene blue dye. Water colored with methylene blue dye was poured onto the feed side of the membrane that was sandwiched between a glass tube and an acrylic ring (FIGS. 11A and 11B). The permeate side of the membrane (the side coated with $TiO_2$) faces the UV lamp. As a result of the photocatalytic reaction on the $TiO_2$ coated side of the membrane, the methylene blue dye is degraded under UV-light irradiation as shown in FIGS. 12A and 12B. FIG. 13 shows the degradation efficiency of the $TiO_2$ coated membrane as a function of the number of water loops at constant UV light intensity, while FIG. 14 presents the degradation efficiency of $TiO_2$ coated membrane per two consecutive water loops. No noticeable dye color was observed in the resulting water permeate after 10 loops. The entire photo-degradation procedure was finished in a couple of minutes. The degradation efficiency of the $TiO_2$ coated membrane vs. the intensity of the UV beam is presented in FIG. 15. The degradation efficiency of the $TiO_2$ coated membrane reached its maxima (~100%) for a constant number of applied water loops when the UV lamp intensity was increased.

Example 8

Robustness Measurement of $TiO_2$ Coated Membrane

Figure 16:
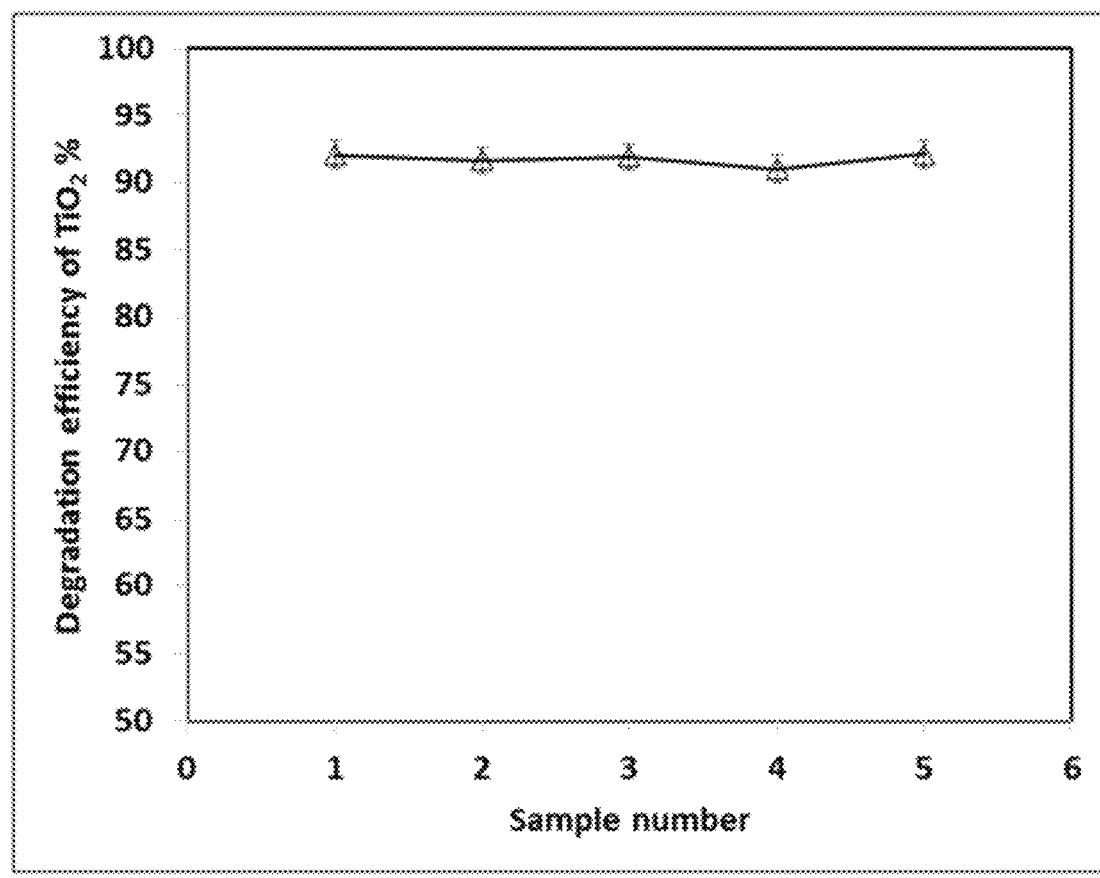
FIG. 16 shows the degradation efficiency of a single $TiO_2$ coated membrane on an organic pollutant for five separate samples with ten water loops each.
Figure 17:
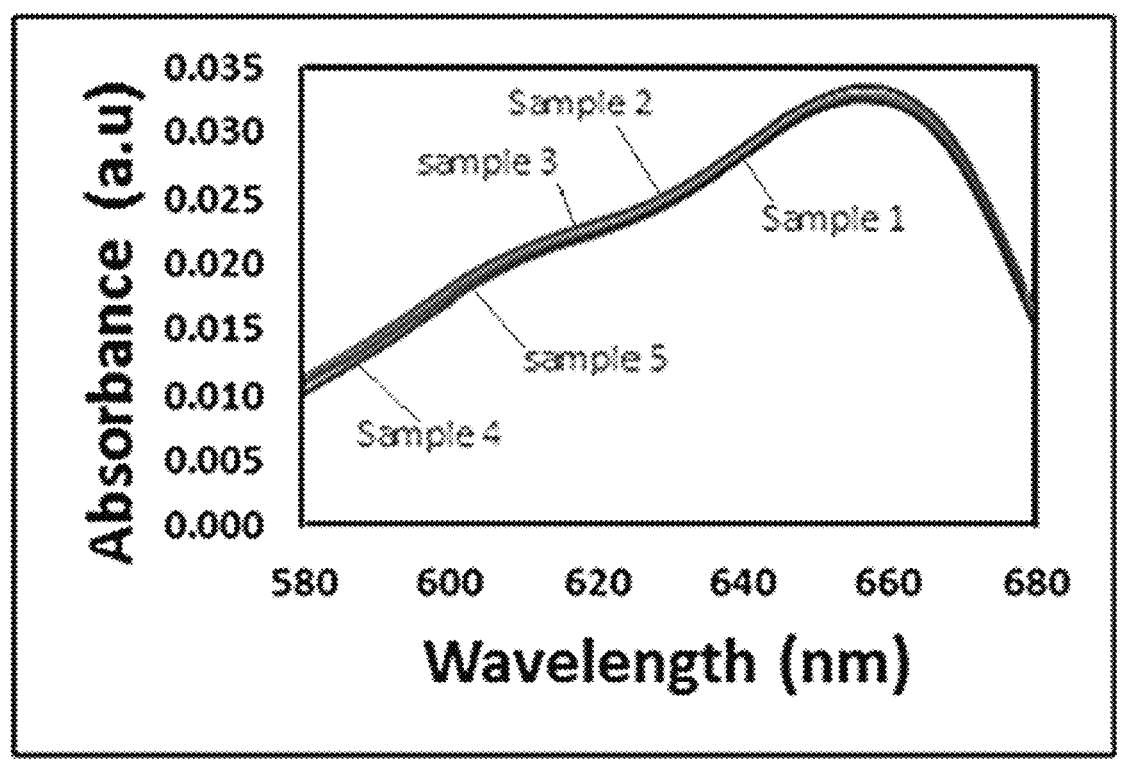
FIG. 17 shows absorption spectra of the five samples of FIG. 16 after methylene blue dye removal.

The robustness of the permeate side of the membrane was measured by comparing the photocatalytic degradation efficiency of the $TiO_2$ coated membrane for 5 consecutive samples with the same initial concentration of methylene blue dye (5 ppm, or 5 mg/L) after 10 water loops for each sample. FIGS. 16 and 17 show the results of the robustness test. These results demonstrate that the $TiO_2$ coating is greatly robust, having an almost constant photocatalytic degradation efficiency for all samples.

Example 9

Figure 18A:
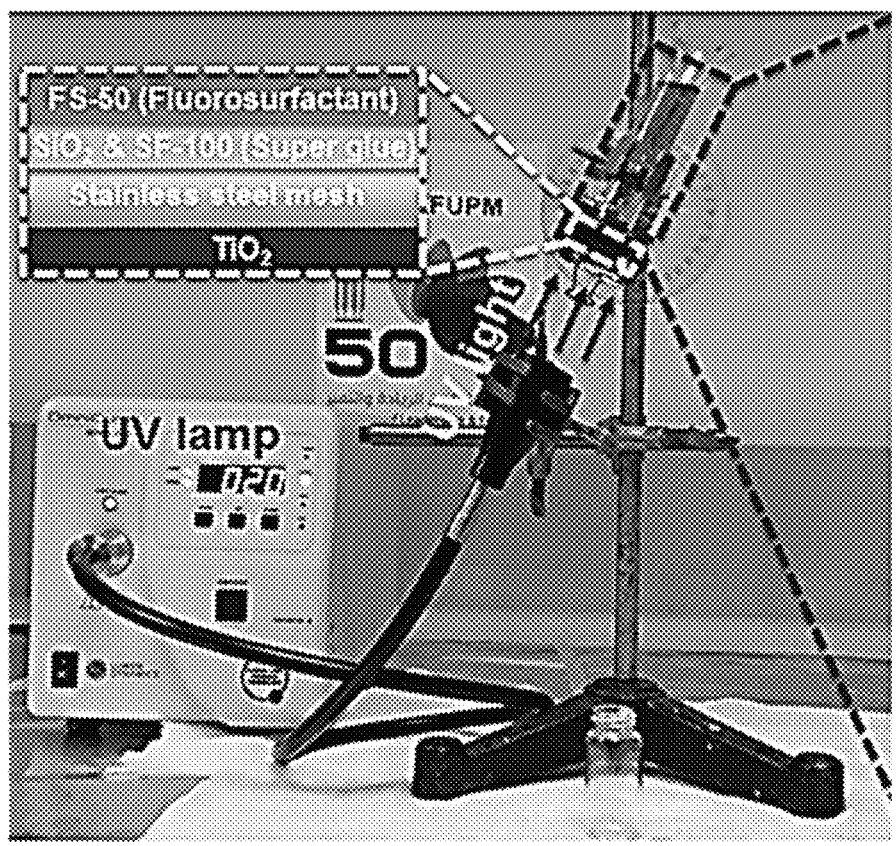
FIG. 18A shows the apparatus for filtering a contaminated oil-water mixture using the oil-water separation membrane (SSFT) with UV light irradiation.
Figure 18B:
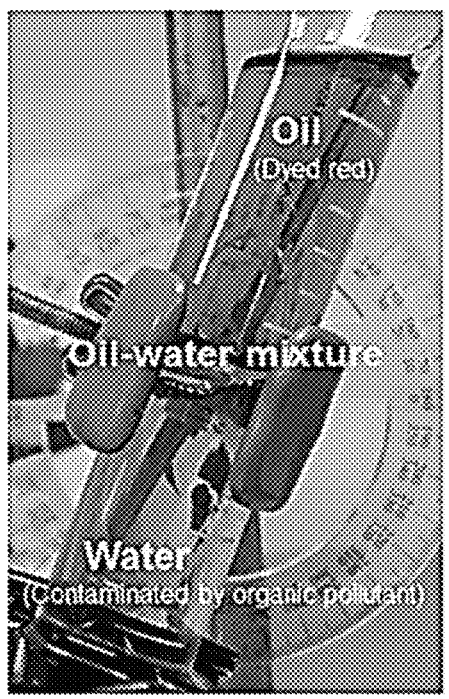
FIG. 18B shows a zoomed in view of the oil-water mixture in the apparatus of FIG. 18A.
Figure 19A:
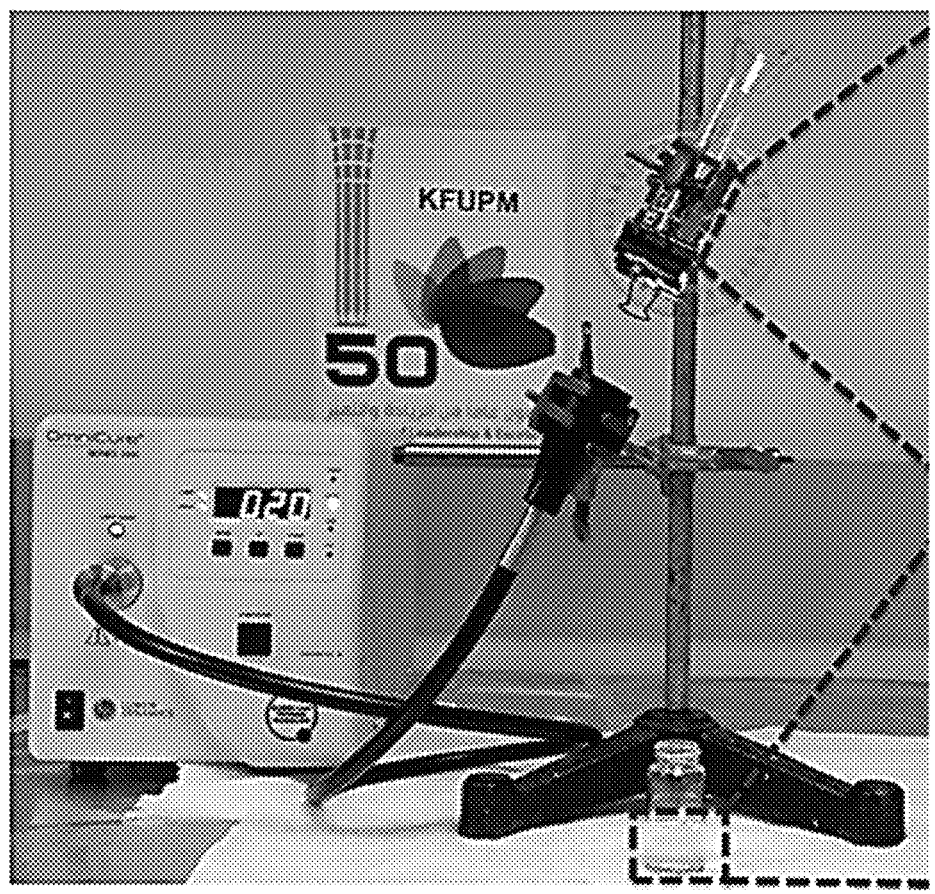
FIG. 19A shows the apparatus of FIG. 18A, after the filtering.
Figure 19B:
FIG. 19B is a zoomed in view of the water-free oil phase left above the oil-water separation membrane in FIG. 19A.
Figure 19C:
FIG. 19C is a zoomed in view of FIG. 19A, showing the oil-free water below the apparatus, free of the aqueous organic pollutant.

Performance of SSFT Coated Membrane for in-Air Oil-Water Separation and Simultaneous Removal of Organic Pollutants In this section, we show the performance of an SSFT coated membrane ($SiO_2$/SF-100/FS-50/$TiO_2$) for separating the water phase from an oil-water mixture with simultaneous degradation of organic pollutants from the water phase. The oil-water mixture (50% hexadecane (dyed red) and 50% water (with methylene blue dye), by volume) was poured onto the feed side of the membrane that was sandwiched between a glass tube and an acrylic ring as shown in FIGS. 18A and 18B. As a result of the exceptional in-air superhydrophilic and superoleophobic behavior of the feed side of the membrane and the photocatalytic activity of the permeate side of the membrane, oil was retained by the feed side, and the organic pollutants were removed from the water phase by the permeate side under UV irradiation during the separation process, as shown in FIGS. 19A-19C. No noticeable oil or methylene blue dye was noticed in the water permeate after 10 cycles (FIG. 19C), demonstrating high quality and sustainable oil-water separation from oil-water mixture and simultaneous photo-catalytic removal of organic pollutants. The entire oil-water separation and simultaneous removal of organic dye was finished in a couple of minutes.

The invention claimed is:

1. An oil-water separation membrane, comprising:
a porous metal sheet with a first side and a second side,
a feed side coating deposited on the first side of the porous metal sheet, the feed side coating comprising:
a first layer in direct contact with the first side of the porous metal sheet, wherein the first layer comprises nanoparticles and an adhesive, and
a surfactant deposited on the first layer, and
a permeate side coating deposited on the second side of the porous metal sheet, the permeate side coating comprising a layer of photocatalyst nanoparticles.

2. The oil-water separation membrane of claim 1, wherein the porous metal sheet has a thickness of 40-100 µm and a pore size of 0.5-4 µm.

3. The oil-water separation membrane of claim 1, wherein the porous metal sheet comprises steel.

4. The oil-water separation membrane of claim 1, wherein the nanoparticles are silica nanoparticles with a diameter of 5-100 nm.

5. The oil-water separation membrane of claim 1, wherein the adhesive comprises a cyanoacrylate in reacted form.

6. The oil-water separation membrane of claim 1, wherein the surfactant is an amphoteric fluorosurfactant.

7. The oil-water separation membrane of claim 1, wherein the photocatalyst nanoparticles have a diameter of 25-100 nm.

8. The oil-water separation membrane of claim 1, wherein the photocatalyst nanoparticles comprise at least one metal oxide selected from the group consisting of $TiO_2$, $WO_3$, $ZnO$, $NiO$, $CuO$, $SnO_2$, $CeO_2$, $SiO_2$, $ZrO_2$, $Al_2O_3$, and $Fe_2O_3$.

9. The oil-water separation membrane of claim 1, which is both hydrophilic with a water contact angle in air of 0°-5°, and oleophobic with an oil contact angle in air of 145°-165°.

10. The oil-water separation membrane of claim 1, wherein the feed side coating has a thickness of 10-50 µm, and wherein the permeate side coating has a thickness of 200 nm-5 µm.

11. The oil-water separation membrane of claim 1, wherein the feed side coating, the permeate side coating, or both further comprise activated carbon or a zeolite.

12. An oil-water separation system, comprising:
a vessel with an internal cavity;
the oil-water separation membrane of claim 1, which divides the internal cavity into a feed zone and a permeate zone; and
a UV light source configured to irradiate a UV light to the permeate side coating of the oil-water separation membrane,
wherein the feed zone has a feed inlet to deliver an oil-water mixture to the feed zone, and
wherein the permeate zone has a water outlet to reject water from the permeate zone.

13. The oil-water separation system of claim 12, wherein the separation membrane is tilted at an angle of 15°-30° above a horizontal plane.

14. A method of producing a purified water product from a contaminated water mixture comprising an oil phase and an aqueous phase having an organic aqueous pollutant with the oil-water separation system of claim 12, the method comprising:
contacting the contaminated water mixture with the feed side coating of the oil-water separation membrane, wherein the aqueous phase permeates through to the permeate side coating, leaving a retained oil phase in the feed zone; and
irradiating the permeate side coating with UV light to photo-catalytically degrade a portion of the organic aqueous pollutant present in the aqueous phase that permeates through the oil-water separation membrane to produce a purified water product.

15. The method of claim 14, wherein the UV light has an intensity of 450-1550 $mW/cm^2$.

16. The method of claim 15, wherein a pressure difference across the membrane is 0-5 kPa.

17. The method of claim 16, wherein the pressure difference is 0-1 kPa, and
wherein the aqueous phase permeates through the membrane at a flow speed of 0.5-5.0 mm/s.

18. The method of claim 14, further comprising:
draining the retained oil phase from the feed zone; and
reapplying the purified water product to the feed side coating.

19. The method of claim 18, wherein the reapplying is done at least 9 times to produce a purified water product having at least a 99% reduction in a concentration of the organic contaminant compared to a concentration of the organic contaminant in the aqueous phase before the contacting.

20. The method of claim 18, wherein the reapplying is done at least 9 times and wherein at least 99 wt % of the oil phase relative to a total weight of the oil phase in the contaminated water mixture is retained as the retained oil phase.

* * * * *